(12) United States Patent
Krishnasamy et al.

(10) Patent No.: US 12,556,046 B2
(45) Date of Patent: Feb. 17, 2026

(54) MOTOR HAVING NON-CIRCULAR STATOR

(71) Applicant: Persimmon Technologies Corporation, Wakefield, MA (US)

(72) Inventors: Jayaraman Krishnasamy, Boxborough, MA (US); Martin Hosek, Salem, NH (US); Dennis Poole, East Derry, NH (US)

(73) Assignee: Persimmon Technologies Corporation, Wakefield, MA (US)

( * ) Notice: Subject to any disclaimer, the term of this patent is extended or adjusted under 35 U.S.C. 154(b) by 678 days.

(21) Appl. No.: 17/330,707

(22) Filed: May 26, 2021

(65) Prior Publication Data

US 2021/0296946 A1    Sep. 23, 2021

Related U.S. Application Data

(62) Division of application No. 16/195,174, filed on Nov. 19, 2018, now Pat. No. 11,043,857, which is a division of application No. 15/011,802, filed on Feb. 1, 2016, now Pat. No. 10,170,946.

(60) Provisional application No. 62/110,752, filed on Feb. 2, 2015.

(51) Int. Cl.
| | | |
|---|---|---|
| H02K 1/14 | (2006.01) | |
| B25J 9/12 | (2006.01) | |
| F16H 25/20 | (2006.01) | |
| H02K 1/278 | (2022.01) | |
| H02K 7/06 | (2006.01) | |
| H02K 21/16 | (2006.01) | |

(52) U.S. Cl.
CPC ............. *H02K 1/146* (2013.01); *B25J 9/126* (2013.01); *F16H 25/20* (2013.01); *H02K 1/278* (2013.01); *H02K 7/06* (2013.01); *H02K 21/16* (2013.01); *F16H 2025/2081* (2013.01)

(58) Field of Classification Search
CPC .......... H02K 1/146; H02K 1/278; H02K 1/18; H02K 1/185; H02K 7/06; H02K 21/16; F16H 25/20; F16H 2025/2081; B25J 9/126
USPC .................................................. 310/216.074
See application file for complete search history.

(56) References Cited

U.S. PATENT DOCUMENTS

| | | | |
|---|---|---|---|
| 2,496,831 A | | 2/1950 | Van Den Berg |
| 2,830,209 A | * | 4/1958 | Fleckenstein .......... H02K 1/165 |
| | | | 310/216.071 |
| 3,942,055 A | * | 3/1976 | Hoffmeyer ............. H02K 1/165 |
| | | | 310/216.071 |
| 5,107,716 A | | 4/1992 | Torii et al. |

(Continued)

FOREIGN PATENT DOCUMENTS

| | | |
|---|---|---|
| CN | 103640028 A | 3/2014 |
| CN | 104115374 A | 10/2014 |

(Continued)

*Primary Examiner* — Michael Andrews
(74) *Attorney, Agent, or Firm* — MCarter & English, LLP

(57) ABSTRACT

An apparatus includes a motor having a rotor; and a stator, where the rotor is located at least partially in a rotor receiving area of the stator, where the stator includes at least one coil winding and teeth, where the at least one coil winding is located on at least some of the teeth, where the teeth include a first set of the teeth and a second set of the teeth, where the teeth of the first set of teeth are longer in a radial direction from the rotor receiving area than the teeth of the second set of teeth.

16 Claims, 18 Drawing Sheets

(56) References Cited

U.S. PATENT DOCUMENTS

| | | |
|---|---|---|
| 6,348,753 B1 | 2/2002 | Sakai et al. |
| 7,525,231 B2 | 4/2009 | Tamaoka |
| 8,716,909 B2 | 5/2014 | Hosek et al. |
| 9,887,598 B2 | 2/2018 | Hosek et al. |
| 2003/0184183 A1 | 10/2003 | Sakai et al. |
| 2004/0124737 A1* | 7/2004 | Yamamoto ............. H02K 23/30 310/216.012 |
| 2007/0020081 A1 | 1/2007 | Gilchrist et al. |
| 2007/0280813 A1 | 12/2007 | Nakamura |
| 2008/0001494 A1* | 1/2008 | Endo .................... H02K 15/022 310/254.1 |
| 2008/0061653 A1 | 3/2008 | Sagara et al. |
| 2009/0134738 A1* | 5/2009 | Yoshikawa ............ H02K 1/146 310/216.012 |
| 2009/0174280 A1 | 7/2009 | Prudham |
| 2010/0040488 A1* | 2/2010 | Yukitake ................. H02K 1/02 310/44 |
| 2012/0176074 A1 | 7/2012 | Dubois et al. |
| 2013/0000447 A1 | 1/2013 | Hosek et al. |
| 2013/0000860 A1 | 1/2013 | Hosek et al. |
| 2013/0000861 A1 | 1/2013 | Hosek et al. |
| 2013/0002085 A1 | 1/2013 | Hosek et al. |
| 2013/0004359 A1 | 1/2013 | Hosek |
| 2013/0039726 A1 | 2/2013 | Brodine et al. |
| 2013/0292081 A1 | 11/2013 | Hosek et al. |
| 2014/0009025 A1 | 1/2014 | Hosek et al. |
| 2014/0103752 A1 | 4/2014 | Hofmeister |
| 2014/0134016 A1 | 5/2014 | Flett |
| 2014/0305246 A1 | 10/2014 | Tsai |
| 2014/0346904 A1 | 11/2014 | Yoon et al. |
| 2015/0118407 A1* | 4/2015 | Hosek ...................... C23C 4/08 252/62.55 |
| 2015/0228509 A1 | 8/2015 | Hosek |

FOREIGN PATENT DOCUMENTS

| | | |
|---|---|---|
| DE | 1563066 A1 | 3/1970 |
| DE | 102011018294 A1 | 11/2011 |
| EP | 1806822 A1 | 7/2007 |
| FR | 2899396 A1 | 10/2007 |
| GB | 986789 A | 3/1965 |
| GB | 2257844 A | 1/1993 |
| JP | S-5148654 Y1 | 11/1976 |
| JP | S-5872957 U | 5/1983 |
| JP | 2001061248 A | 3/2001 |
| JP | 2003158834 A | 5/2003 |
| JP | 2003235183 A | 8/2003 |
| JP | 2005065452 A | 3/2005 |
| JP | 2005080432 A | 3/2005 |
| JP | 2006087190 A | 3/2006 |
| JP | 2006158176 A | 6/2006 |
| JP | 2006304398 A | 11/2006 |
| JP | 2007159262 A | 6/2007 |
| JP | 2007325433 A | 12/2007 |
| JP | 2008131809 A | 6/2008 |
| JP | 2008301650 A | 12/2008 |
| JP | 2009532010 A | 9/2009 |
| WO | WO-0062400 | 10/2000 |
| WO | WO-2012046274 A1 | 2/2014 |

\* cited by examiner

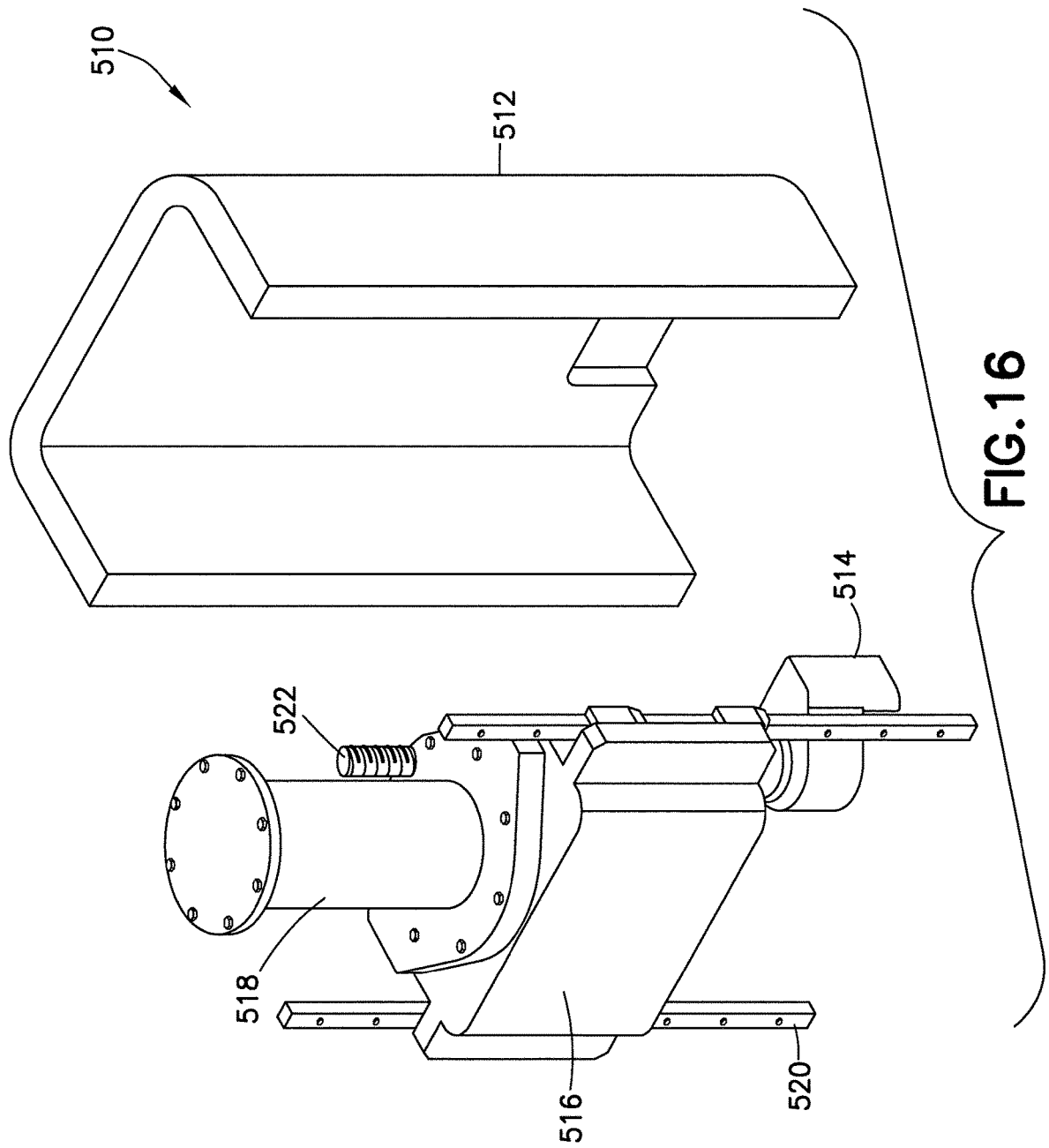

MOTOR HAVING NON-CIRCULAR STATOR

CROSS REFERENCE TO RELATED APPLICATION(S)

This application is a divisional patent application of copending application Ser. No. 16/195,174 filed Nov. 19, 2018, which is a divisional patent application of application Ser. No. 15/011,802 filed Feb. 1, 2016, now U.S. Pat. No. 10,170,946, which claims priority under 35 USC 119(e) to U.S. provisional patent application No. 62/110,752 filed Feb. 2, 2015, which are hereby incorporated by reference in their entireties.

GOVERNMENT SUPPORT

This invention was made with Government support under SBIR Phase II Grant Number 1230458 awarded by the National Science Foundation. The Government has certain rights in this invention.

BACKGROUND

Technical Field

The exemplary and non-limiting embodiments relate generally to electric motors and, more particularly, to a motor having a non-circular stator.

Brief Description of Prior Developments

Electric motors are generally used to provide translational or rotational motion to the various moving elements of automated mechanical devices. The electric motors used typically comprise rotating elements (rotors) assembled with stationary elements (stators). Magnets are located between the rotating and stationary elements or directly on the rotating element. Coils are wound around soft iron cores on the stationary elements and are located proximate the magnets.

In operating an electric motor, an electric current is passed through the coils, and a magnetic field is generated, which acts upon the magnets. When the magnetic field acts upon the magnets, one side of the rotating element is pushed and an opposing side of the rotating element is pulled, which thereby causes the rotating element to rotate relative to the stationary element. Efficiency of the rotation is based at least in part on the shape of the magnetic components used and the characteristics of the materials used in the fabrication of the electric motor.

SUMMARY

The following summary is merely intended to be exemplary. The summary is not intended to limit the scope of the claims.

In accordance with one aspect, an apparatus comprises a motor comprising a rotor and a stator. The rotor is located at least partially in a rotor receiving area of the stator. The stator comprises at least one coil winding and teeth. The at least one coil winding is located on at least some of the teeth, where the teeth comprise a first set of the teeth and a second set of the teeth. The teeth of the first set of teeth are longer in a radial direction from the rotor receiving area than the teeth of the second set of teeth.

In accordance with another exemplary aspect, a method may comprise forming a stator member having teeth. The stator may comprise a rotor receiving area, where the teeth may comprise a first set of the teeth and a second set of the teeth. The teeth of the first set of teeth may be longer in a radial direction from the rotor receiving area than the teeth of the second set of teeth. The method may further comprise locating at least one coil winding on at least some of the teeth.

In accordance with another exemplary aspect, an apparatus may comprise a motor comprising a rotor and a stator. The rotor may be located at least partially in a rotor receiving area of the stator. The stator may comprise a stator member having teeth and at least one component receiving area spaced from the rotor receiving area. The teeth may comprise a first set of the teeth and a second set of the teeth, where the teeth of the first set of teeth may be longer in a radial direction from the rotor receiving area than the teeth of the second set of teeth, and where the second set of teeth are located closer to the least one component receiving area than the first set of teeth. At least one coil winding may be on the stator member. At least one component may be movably located in the at least one component receiving area.

BRIEF DESCRIPTION OF THE DRAWINGS

The foregoing aspects and other features are explained in the following description, taken in connection with the accompanying drawings, wherein:

FIG. 16 is an exploded isometric representation of a robot drive;

DETAILED DESCRIPTION OF EMBODIMENTS

Figure 1A:
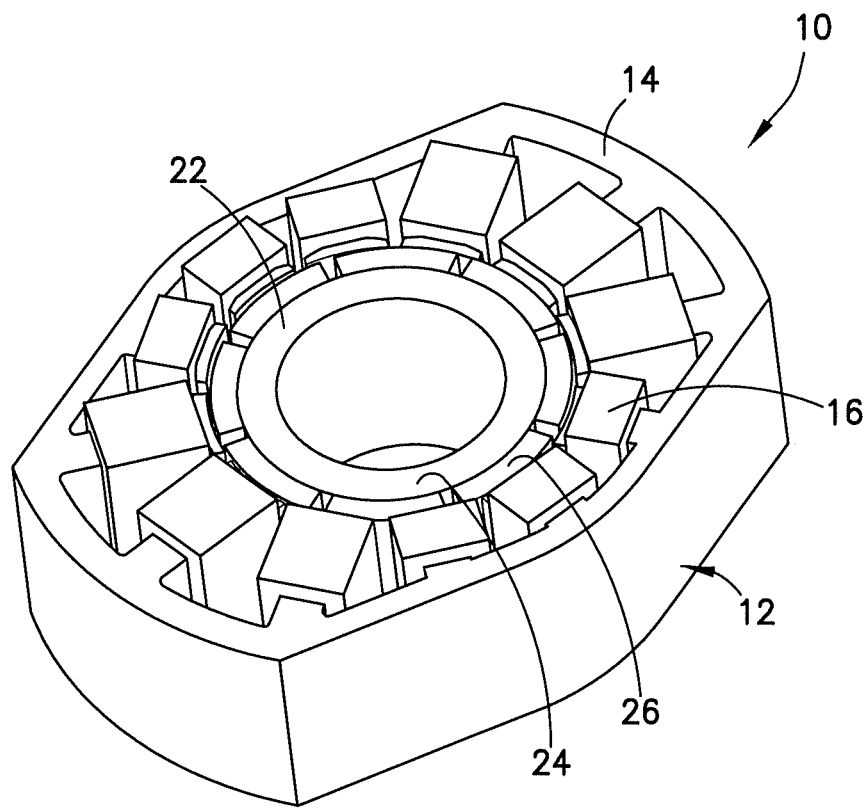
FIG. 1A is an isometric representation of one exemplary embodiment of a motor assembly.

Referring to FIG. 1A, there is shown an isometric representation motor assembly 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 1B:
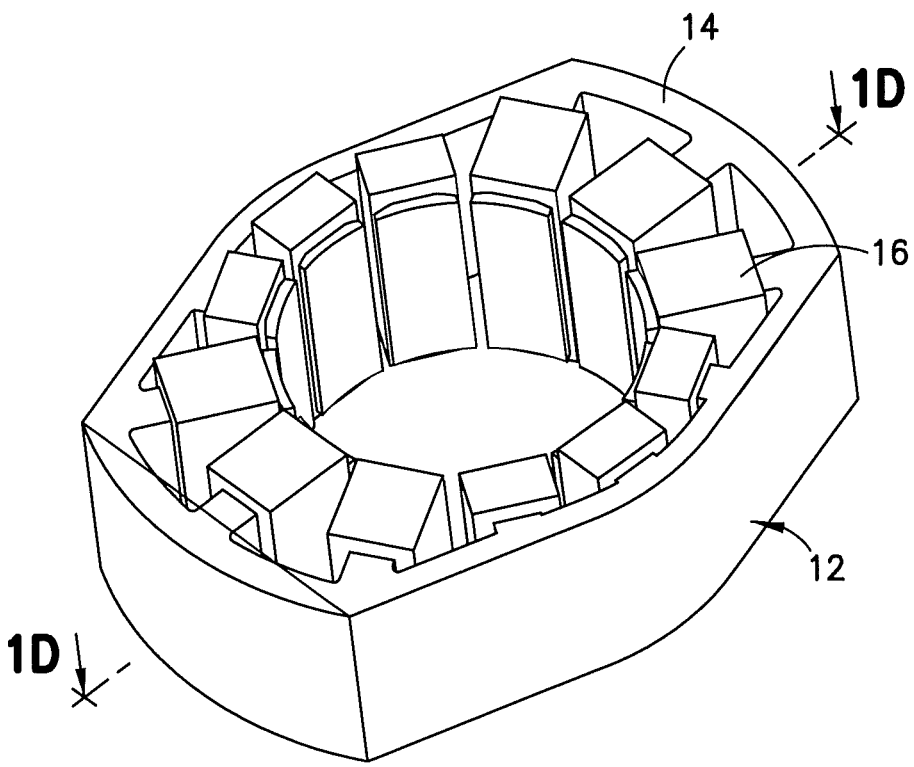
FIG. 1B is an isometric representation of a stator of the motor assembly of FIG. 1A.
Figure 1C:
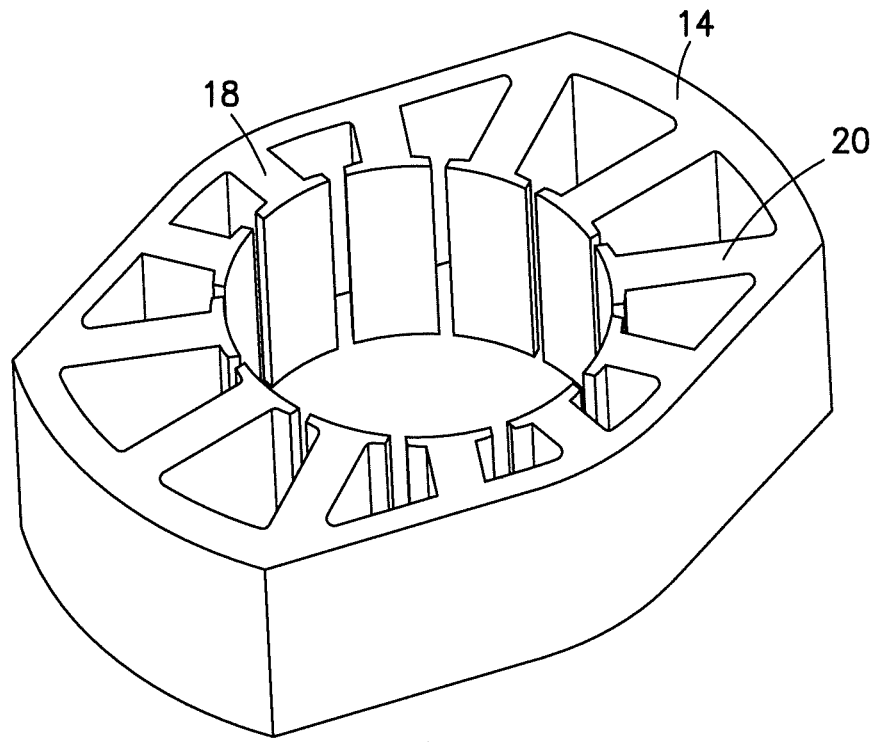
FIG. 1C is an isometric representation of a stator core of the motor assembly of FIG. 1A.
Figure 1D:
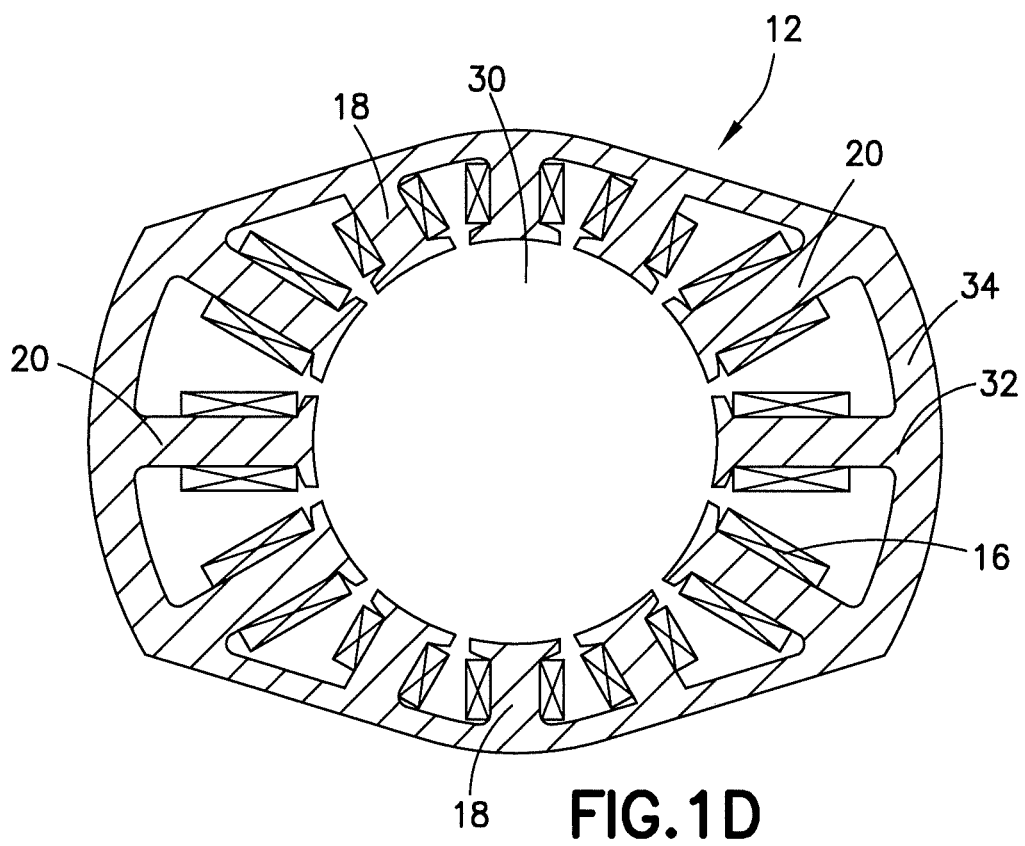
FIG. 1D is a section representation of a stator of the motor assembly of FIG. 1A.

Referring also to FIG. 1B, there is shown an isometric representation of stator 12 of motor assembly 10 of FIG. 1A. Referring also to FIG. 1C, there is shown an isometric representation of stator core 14 of motor assembly 10 of FIG. 1A. Referring also to FIG. 1D, there is shown a section representation of stator 12 of motor assembly 10 of FIG. 1A. Although the features will be described with reference to the example embodiments shown in the drawings, it should be understood that features can be embodied in many alternate forms of embodiments. In addition, any suitable size, shape, or type of elements or materials could be used. For example, as shown, the motor 10 is of a radial flux design. In alternate embodiments, the motor may be of an axial flux design or a hybrid 3-dimensional flux design. The features of the embodiments disclosed herein may similarly be applied to any motor, system, or component incorporating a core comprising a soft magnetic material.

Motor 10 and the subcomponents within motor 10 may have features as disclosed in the following references, all of which are hereby incorporated by reference herein in their entireties: U.S. patent application Ser. No. 14/501,603, entitled "Structures Utilizing a Structured Magnetic Material and Methods for Making" filed Sep. 30, 2014; U.S. patent application Ser. No. 14/501,668, entitled "Structures Utilizing a Structured Magnetic Material and Methods for Making" filed Sep. 30, 2014; U.S. Patent Publication No. 2014/0009025 A1, entitled "Hybrid Field Electric Motor" published Jan. 9, 2014; U.S. Patent Publication No. 2013/0000861 A1, entitled "System and Method for Making Structured Magnetic Material from Insulated Particles" published Jan. 3, 2013; U.S. Patent Publication No. 2013/0004359 A1, entitled "System and Method for Making a Structured Material" published Jan. 3, 2013; U.S. Patent Publication No. 2013/0002085 A1, entitled "Structured Magnetic Material" published Jan. 3, 2013; U.S. Patent Publication No. 2014/0103752 A1, entitled "Hybrid Motor" published Apr. 17, 2014; U.S. Patent Publication No. 2013/0292081 A1, entitled "System and Method for Making a Structured Magnetic Material with Integrated Particle Insulation" published Nov. 7, 2013; U.S. Patent Publication No. 2013/0000860 A1, entitled "System and Method for Making a Structured Magnetic Material via Layered Particle Deposition" published Jan. 3, 2013; and U.S. Patent Publication No. 2013/0000447 A1, entitled "System and Method for Making a Structured Magnetic Material with Integrated Particle Insulation" published Jan. 3, 2013.

In FIG. 1A, motor 10 is shown with a substantially oval shaped stator 12 having stator core 14 and windings 16. In the embodiment shown in FIGS. 1A-1D, a stator 12 is shown with core 14 that has short 18 and long 20 stator teeth. In alternate aspects, teeth 18, 20 may be the same length or more different lengths. The long teeth 20 may have more winding turns than the short teeth, for example, for more torque output for a given current. Alternately, the long teeth 20 may have the same number of turns as the short teeth, but use thicker wire to reduce overall phase resistance. Alternately, a thicker wire may be used on all of the teeth (long and short) and the overall number of winding turns may be maintained the same as a conventional circular motor or higher. For example, in a 3-phase motor, each phase winding may occupy equal numbers of short and long teeth respectively. Alternately, the number of stator teeth is not restricted to 12. In the embodiment shown, rotor 22 is shown cylindrical and having rotor core 24 and rotor magnets 26. Alternately, the rotor may have any suitable shape. FIG. 1A shows a rotor 22 stator 12 combination that makes up motor 10 where motor 10 is shown as a frameless motor. In alternate aspects, a frame may house rotor 22 and stator 12 with suitable bearings for rotor 22 and an output member coupled to rotor 22. In the embodiment shown, two lengths of stator teeth are shown. In alternate aspects more or less different length teeth may be provided with more or less different windings corresponding to the different teeth. In the embodiment, an apparatus is shown as motor 10 having rotor 22 and stator 12 where rotor 22 is located at least partially in rotor receiving area 30 of the stator 12. Stator 12 comprises at least one coil winding 16 and teeth 18, 20. The at least one coil winding 16 is located on at least some of the teeth 18, 20, where the teeth comprise a first set of the teeth 20 and a second set of the teeth 18. The teeth of the first set of teeth 20 are longer in a radial direction from the rotor receiving area 30 than the teeth of the second set of teeth 18. Here, the stator may comprise a stator member forming the teeth. Base 32 of each of the teeth may be located at a portion of the stator member which forms an outer perimeter wall 34 of the stator member. The outer perimeter wall 34 may have a shape as one of a substantial oval shape, a substantial triangle shape, a substantial square shape, a substantial rectangle shape or a substantial polygon shape. In alternate aspects, any suitable shape may be provided. In alternate aspects, the at least one coil winding 16 may be located on the first and second sets of teeth. The at least one coil winding 16 may comprise more winding turns on the first set of teeth than the second set of teeth and/or where the at least one coil winding 16 may comprise thicker wire on the first set of teeth 20 than the second set of teeth 18.

Figure 2A:
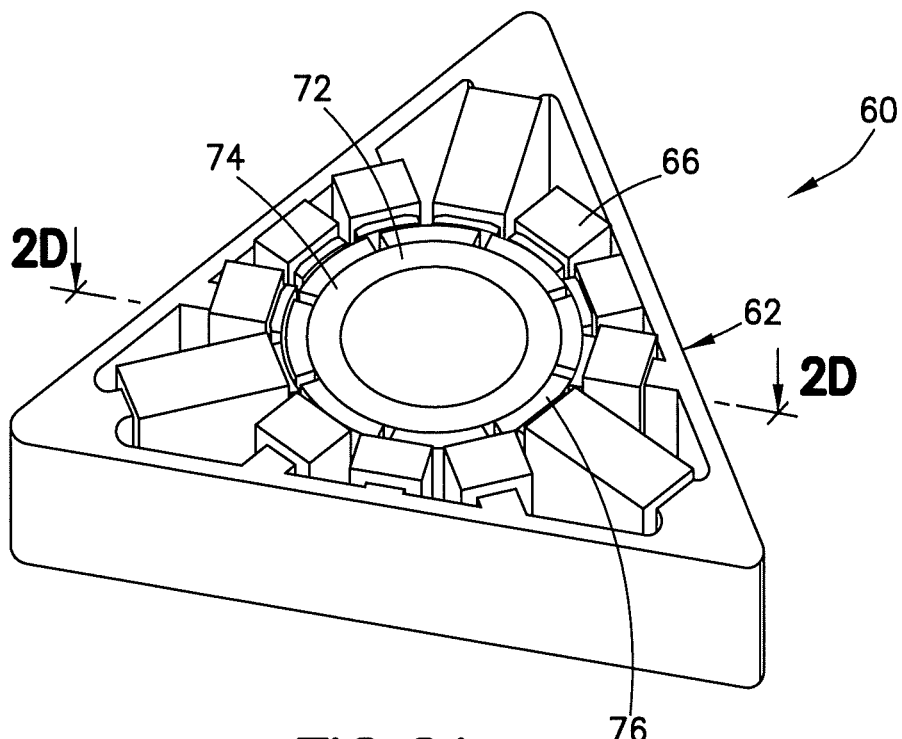
FIG. 2A is an isometric representation of one exemplary embodiment of a motor assembly.
Figure 2B:
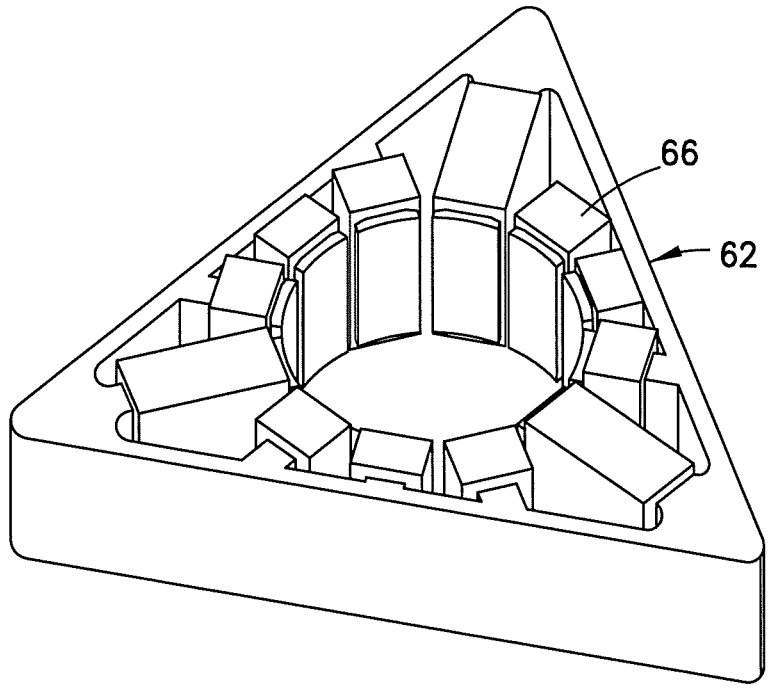
FIG. 2B is an isometric representation of a stator of the motor assembly of FIG. 2A.
Figure 2C:
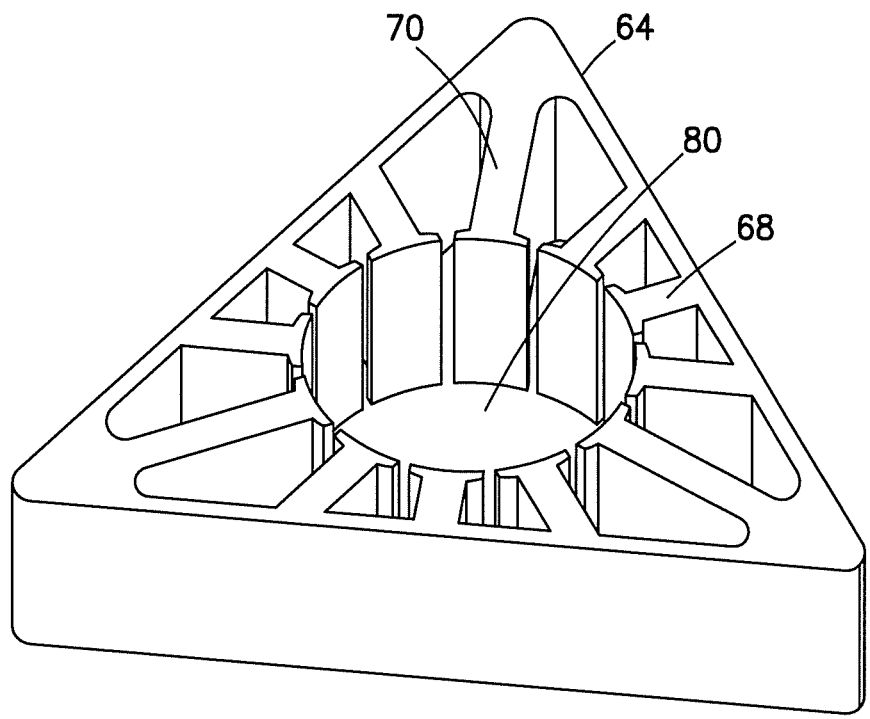
FIG. 2C is an isometric representation of a stator core of the motor assembly of FIG. 2A.
Figure 2D:
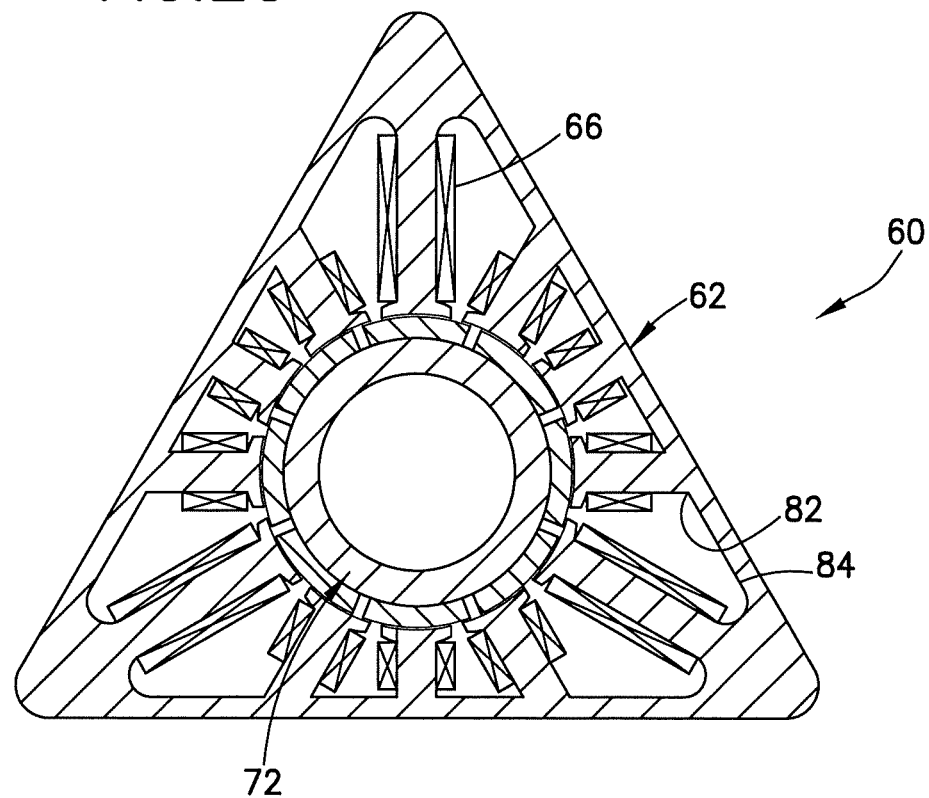
FIG. 2D is a section representation of a stator and rotor of the motor assembly of FIG. 2A.

Referring now to FIG. 2A, there is shown an isometric representation of motor assembly 60 with a triangular shaped stator 62. Referring also to FIG. 2B, there is shown an isometric representation of stator 62 of motor assembly 60 of FIG. 2A. Referring also to FIG. 2C, there is shown an isometric representation of stator core 64 of motor assembly 60 of FIG. 2A. Referring also to FIG. 2D, there is shown a section representation of stator 62 of motor assembly 60 of FIG. 2A. In FIG. 2A, motor 60 is shown where stator 62 is triangular in shape having stator core 64 and windings 66. In the embodiment shown in FIGS. 2A-2D, a stator 62 is shown with core 64 that has short 68 and long 70 stator teeth. In alternate aspects, teeth 68, 70 may be the same length or more different lengths. The long teeth 70 may have more winding turns than the short teeth, for example, for more torque output for a given current. Alternately, the long teeth 70 may have the same number of turns as the short teeth, but use thicker wire to reduce overall phase resistance. Alternately, a thicker wire may be used on all of the teeth (long and short) and the overall number of winding turns may be maintained the same as a conventional circular motor or higher. For example, in a 3-phase motor, each phase winding may occupy equal numbers of short and long teeth respectively. Alternately, the number of stator teeth is not restricted to 12. In the embodiment shown, rotor 72 is shown cylindrical and having rotor core 74 and rotor magnets 76. Alternately, the rotor may have any suitable shape. FIG. 2A shows a rotor 72 stator 62 combination that makes up motor 60 where motor 60 is shown as a frameless motor. In alternate aspects, a frame may house rotor 72 and stator 62 with suitable bearings for rotor 72 and an output member coupled to rotor 72. In the embodiment shown, multiple lengths of stator teeth are shown. In alternate aspects more or less different length teeth may be provided with more or less different windings corresponding to the different teeth. In the embodiment, an apparatus is shown as motor 60 having rotor 72 and stator 62 where rotor 72 is located at least partially in rotor receiving area 80 of the stator 62. Stator 62 comprises at least one coil winding 66 and teeth 68, 70. The at least one coil winding 66 is located on at least some of the teeth 68, 70, where the teeth comprise a first set of the teeth 70 and a second set of the teeth 68. The teeth of the first set of teeth 70 are longer in a radial direction from the rotor receiving area 80 than the teeth of the second set of teeth 68. Here, the stator may comprise a stator member forming the teeth. Base 82 of each of the teeth may be located at a portion of the stator member which forms an outer perimeter wall 84 of the stator member. The outer perimeter wall 84 may have a shape as one of a substantial oval shape, a substantial triangle shape, a substantial square shape, a substantial rectangle shape or a substantial polygon shape. In alternate aspects, any suitable shape may be provided. In alternate aspects, the at least one coil winding 66 may be located on the first 70 and second 68 sets of teeth. The at least one coil winding 66 may comprise more winding turns on the first set of teeth than the second set of teeth and/or where the at least one coil winding 66 may comprise thicker wire on the first set of teeth than the second set of teeth.

Figure 3A:
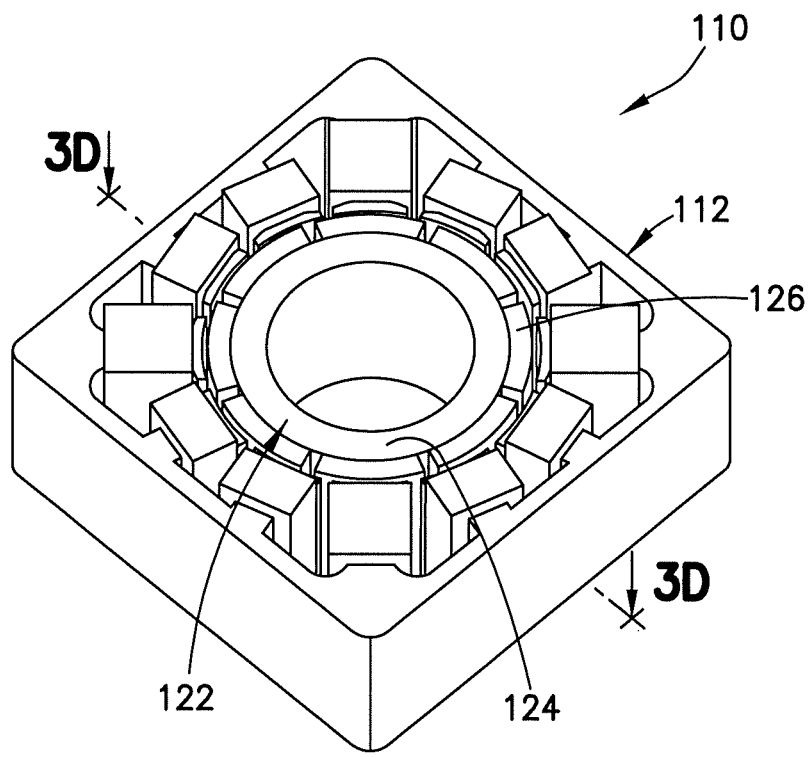
FIG. 3A is an isometric representation of one exemplary embodiment of a motor assembly.
Figure 3B:
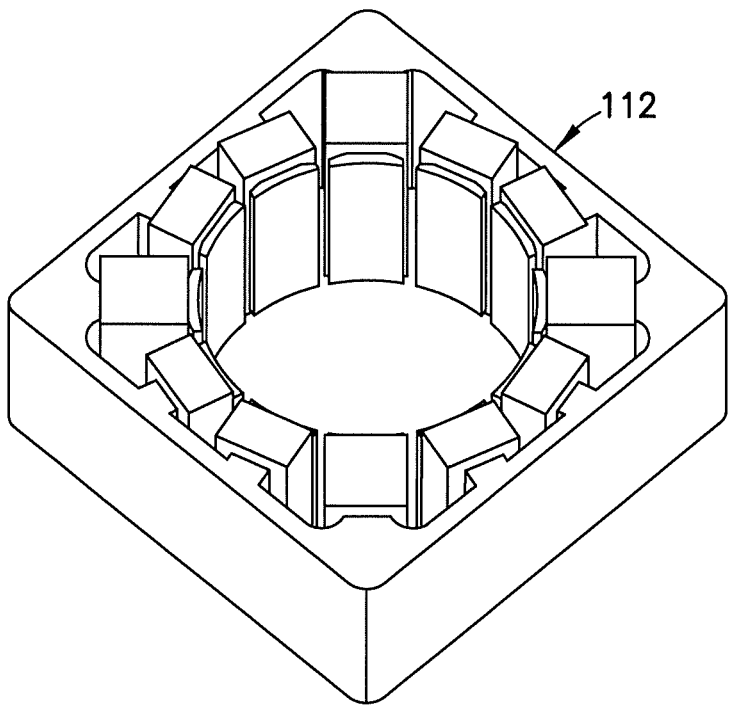
FIG. 3B is an isometric representation of a stator of the motor assembly of FIG. 3A.
Figure 3C:
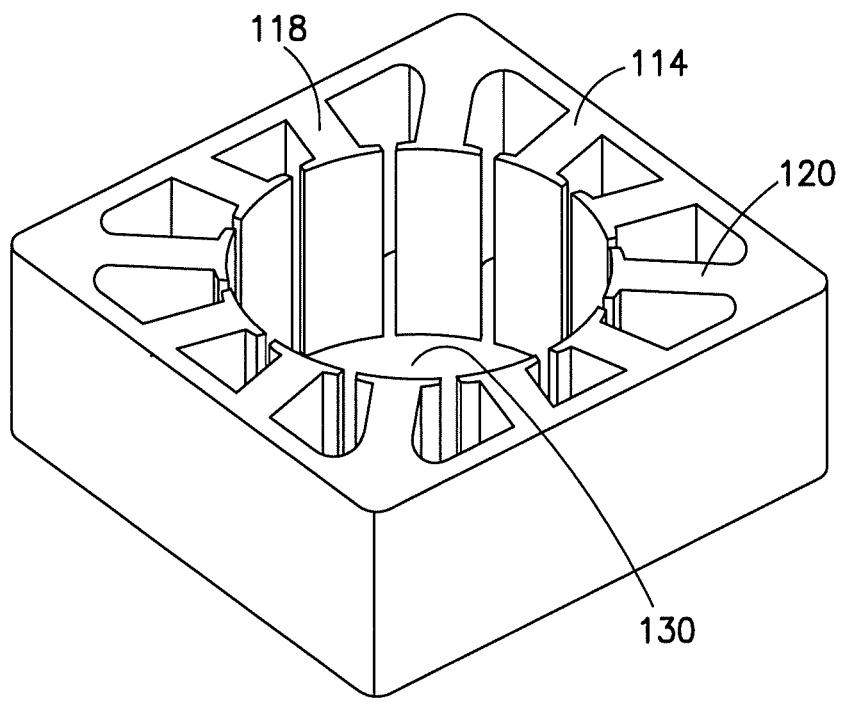
FIG. 3C is an isometric representation of a stator core of the motor assembly of FIG. 3A.
Figure 3D:
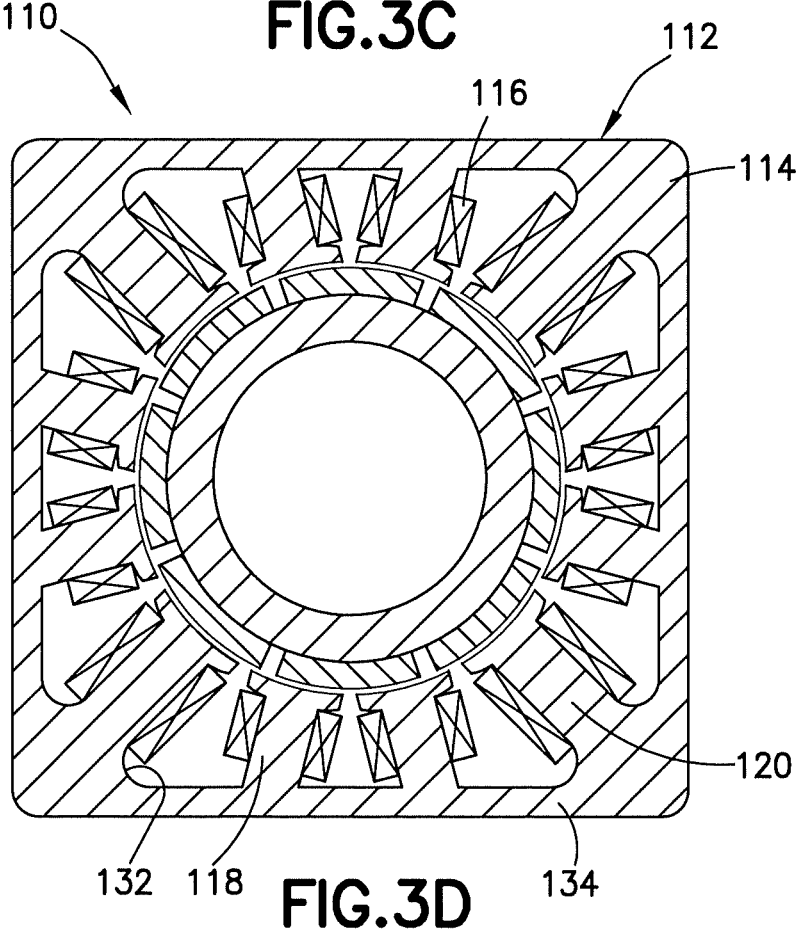
FIG. 3D is a section representation of a stator and rotor of the motor assembly of FIG. 3A.

In FIG. 3A, motor 110 is shown with a substantially square shaped stator 112 having stator core 114 and windings 116. In the embodiment shown in FIGS. 3A-3D, a stator 112 is shown with core 114 that has short 118 and long 120 stator teeth. In alternate aspects, teeth 118, 120 may be the same length or more different lengths. The long teeth 120 may have more winding turns than the short teeth 118, for example, for more torque output for a given current. Alternately, the long teeth 120 may have the same number of turns as the short teeth 118, but use thicker wire to reduce overall phase resistance. Alternately, a thicker wire may be used on all of the teeth (long and short) and the overall number of winding turns may be maintained the same as a conventional circular motor or higher. For example, in a 3-phase motor, each phase winding may occupy equal numbers of short and long teeth respectively. Alternately, the number of stator teeth is not restricted to 12. In the embodiment shown, rotor 122 is shown cylindrical and having rotor core 124 and rotor magnets 126. Alternately, the rotor may have any suitable shape. FIG. 3A shows a rotor 122 stator 112 combination that makes up motor 110 where motor 110 is shown as a frameless motor. In alternate aspects, a frame may house rotor 122 and stator 112 with suitable bearings for rotor 122 and an output member coupled to rotor 122. In the embodiment shown, two lengths of stator teeth are shown. In alternate aspects more or less different length teeth may be provided with more or less different windings corresponding to the different teeth. In the embodiment, an apparatus is shown as motor 110 having rotor 122 and stator 112 where rotor 122 is located at least partially in rotor receiving area 130 of the stator 112. Stator 112 comprises at least one coil winding 116 and teeth 118, 120. The at least one coil winding 116 is located on at least some of the teeth 118, 120, where the teeth comprise a first set of the teeth 120 and a second set of the teeth 118. The teeth of the first set of teeth 120 are longer in a radial direction from the rotor receiving area 130 than the teeth of the second set of teeth 118. Here, the stator may comprise a stator member forming the teeth. Base 132 of each of the teeth may be located at a portion of the stator member which forms an outer perimeter wall 134 of the stator member. The outer perimeter wall 134 may have a shape as one of a substantial oval shape, a substantial triangle shape, a substantial square shape, a substantial rectangle shape or a substantial polygon shape. In alternate aspects, any suitable shape may be provided. In alternate aspects, the at least one coil winding 116 may be located on the first 118 and second 120 sets of teeth. The at least one coil winding 116 may comprise more winding turns on the first set of teeth 118 than the second set of teeth 120 and/or where the at least one coil winding 116 may comprise thicker wire on the first set of teeth 118 than the second set of teeth 120.

Figure 4:
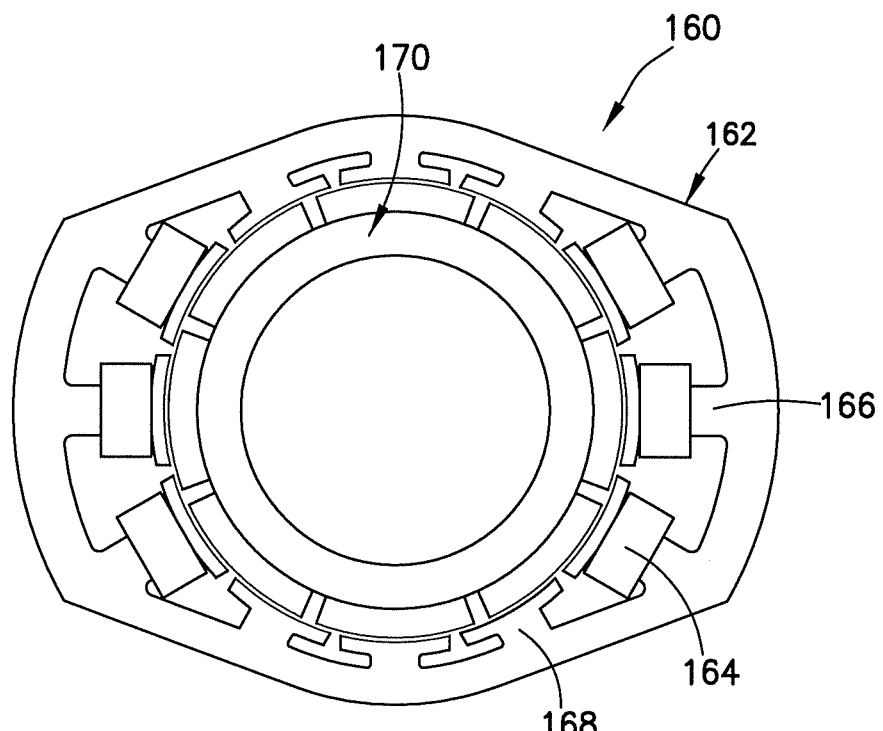
FIG. 4 is an top representation of one exemplary embodiment of a motor assembly.

Referring now to FIG. 4, there is shown a top representation of one exemplary embodiment of motor assembly 160 having a stator 162 with windings 164 on a subset of the poles 166, 168. Here, in FIG. 4, there is shown an oval stator 162 and rotor 170. Here, of the 12 stator teeth, windings are present in only 6 of the teeth. Alternately, more or less teeth and/or windings may be provided. Here, the embodiment allows for a larger rotor and consequently larger ball screw, for example, in a Z motor. Alternately, similar embodiments are possible with shapes or otherwise with respect to the Figures and description here in. Here, the presence of teeth 168 with no coils may enable minimization of cogging torque by way of example. In the apparatus shown, at least one coil winding 164 may be located on a first set of teeth 166 and not located on a second set of teeth 168. In alternate aspects, more or less teeth with more or less windings may be provided. For example, a stator may be provided with no poles or windings along certain directions as shown in FIG. 5.

Figure 5:
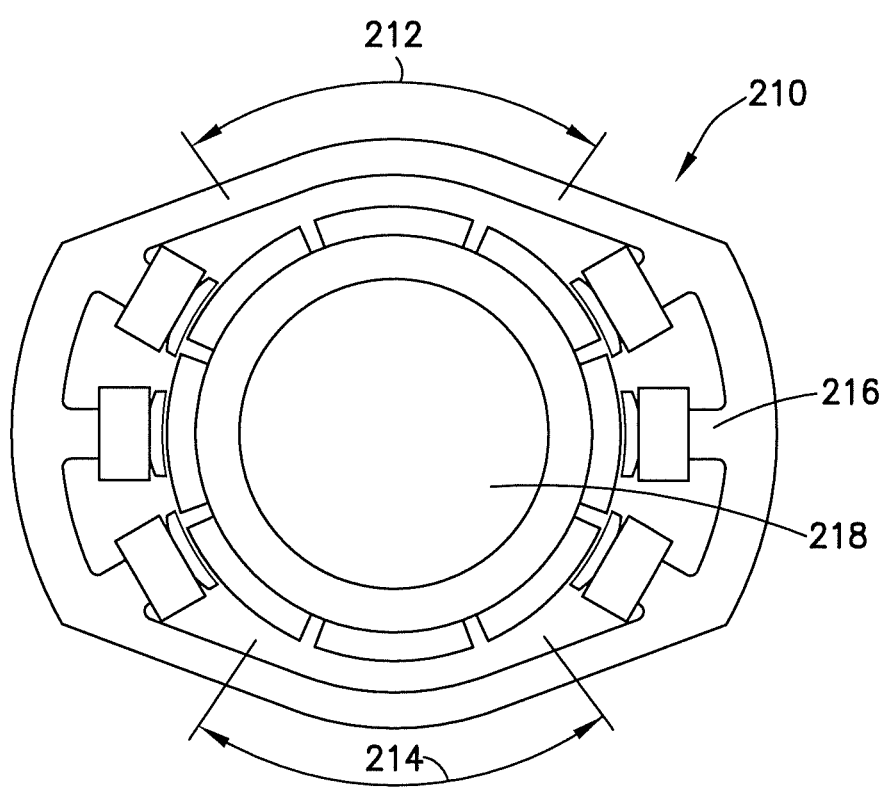
FIG. 5 is an top representation of one exemplary embodiment of a motor assembly.

Referring now to FIG. 5, there is shown a top representation of one exemplary embodiment of motor assembly 210. In FIG. 5, there is shown a similar stator to that shown with respect to FIG. 4 but with no teeth in certain stator sections 212, 214. The embodiment may allow for a larger rotor and packaging of a larger ball screw by way of example. Further, the embodiment may be applicable to other shapes, for example, with respect to the figures and description here in. In the apparatus 210 of FIG. 5, the teeth 216 may extend radially inward towards the rotor receiving area 218 where the teeth 216 may not be located on two opposite sides 212, 214 of the rotor receiving area 218 along arcs, for example, of about 40-100 degrees or other suitable angles or ranges of angles.

Figure 6:
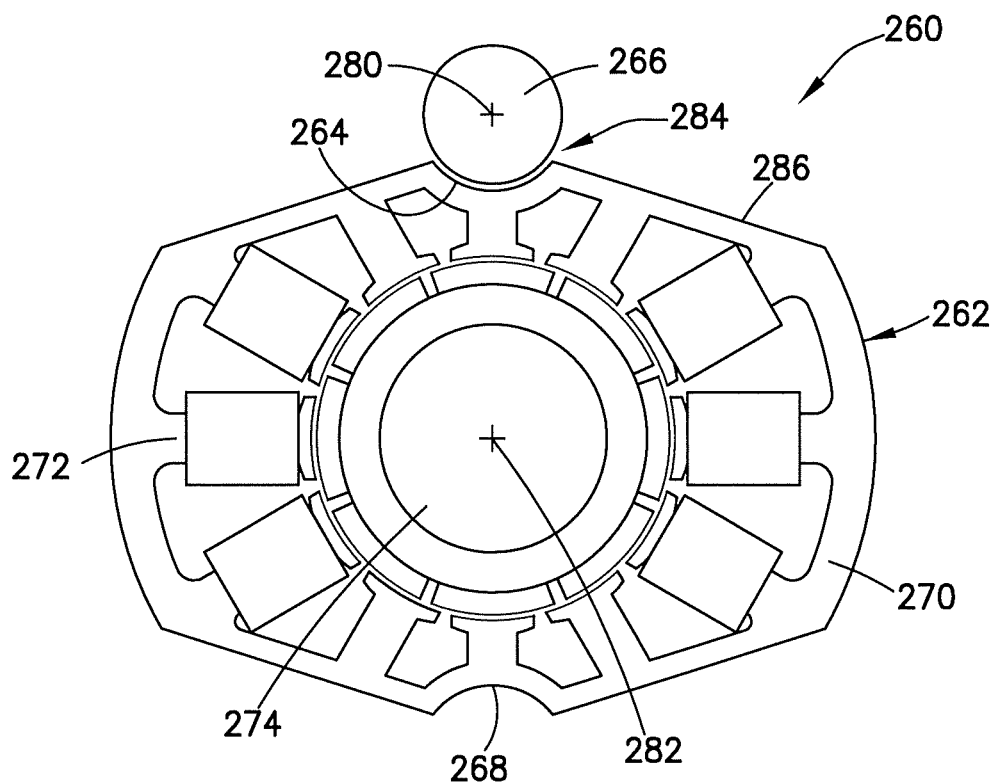
FIG. 6 is an top representation of one exemplary embodiment of a motor assembly.
Figure 7:
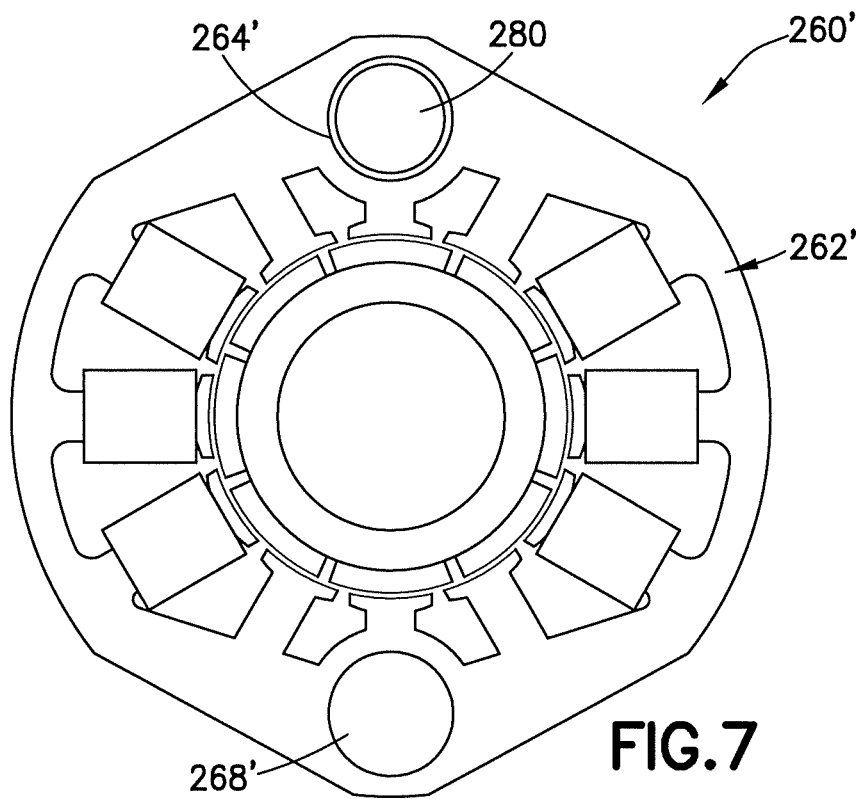
FIG. 7 is an top representation of one exemplary embodiment of a motor assembly.

Referring now to FIG. 6, there is shown a top representation of one exemplary embodiment of motor assembly 260. Motor 260 has stator 262 with a cutout 264 for alternate packaging of other components 266, for example, a Z motor ball screw or otherwise. Cutout 268 may be provided further for symmetry. Alternately, more or less cutouts may be provided. In FIG. 6, a variation of FIG. 4 may be shown with opposite sides of the stator recessed 264, 266 to allow packaging of other assembly components-such as ball screw of a Z motor in a robot assembly. The disclosed may further be applied to the figures above alternately. In the apparatus, the stator 262 may comprise a stator member 270 forming teeth 272, where the stator member may comprise at least one component receiving area 264 spaced from the rotor receiving area 274. The at least one component receiving area 264 may be sized and shaped to have a component 266 movably located therein. Here, the at least one component receiving area 264 may have a center axis 280 which is parallel to a center axis 282 of the rotor receiving area 274. The at least one component receiving area 264 may have an open side 284 at a lateral side perimeter wall 286 of the stator member 262. Further, the at least one component receiving area 264 may be substantially closed, for example, as seen in FIG. 7, except at top and bottom sides of the stator member. Referring also to FIG. 7, there is shown a top representation of an alternate exemplary embodiment of motor assembly 260'. Here, stator 262' is shown with a hole 264' to facilitate packaging, for example, to allow a Z motor ball screw 280. In the embodiment shown in FIG. 7, a stator housing 262' has a hole 264' to allow for a ball screw 280 from another motor, such as a Z motor, to pass through. The disclosed may further be applied to the figures above alternately. Here, at least one component 280 may be movably located in the at least one component receiving area 264 where the at least one component 280 may be a rod having a screw thread located in the at least one component receiving area 264. The rod may be configured to rotate in the at least one component receiving area. The at least one component receiving area may be configured for the stator to longitudinally move up and down along the rod. As shown with respect to FIGS. 10-18, the apparatus may further comprise a motor housing having the stator therein. The stator housing may be connected to the screw thread of the rod such that rotation of the rod causes the motor housing to longitudinally move along the rod.

Figure 8A:
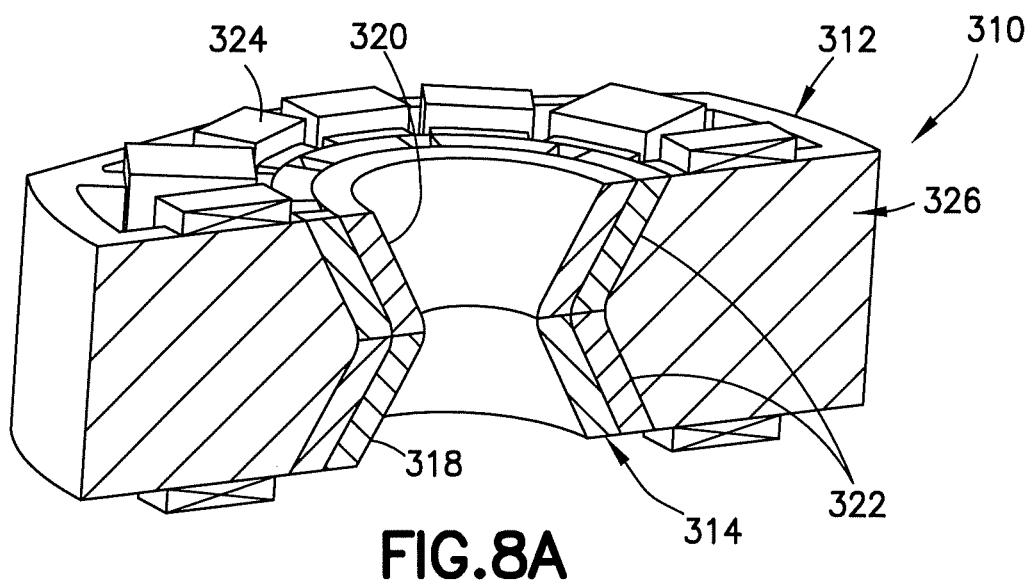
FIG. 8A is an isometric section representation of one exemplary embodiment of a motor assembly.
Figure 8B:
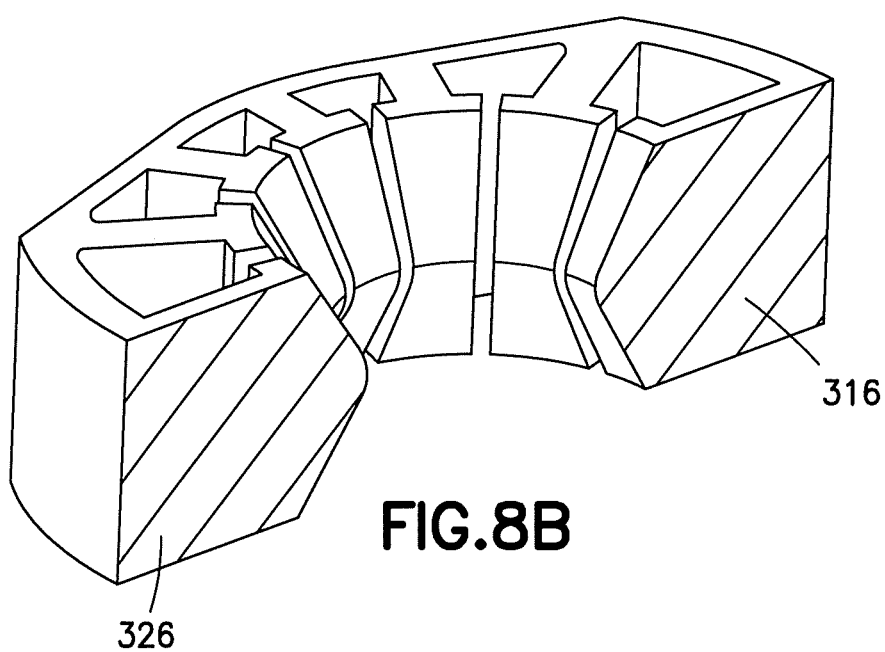
FIG. 8B is an isometric section representation of a stator core of the motor assembly of FIG. 8A.
Figure 8C:
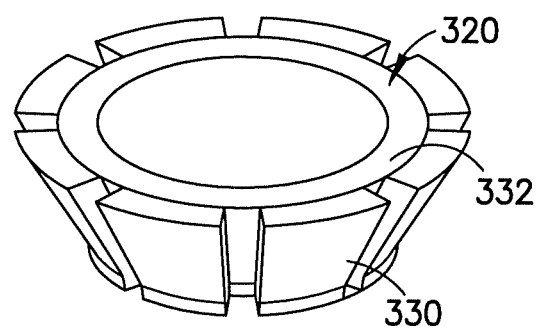
FIG. 8C is an isometric section representation of a rotor portion of the motor assembly of FIG. 8A.

Referring now to FIG. 8A, there is shown an isometric section representation of one exemplary embodiment of motor assembly 310 having stator 312 and rotor 314 where rotor 314 has first portion 318 and second portion 320. Here, a non-circular stator with non-cylindrical air gap is shown by way of example. Referring also to FIG. 8B, there is shown an isometric section representation of stator core 316 of the motor assembly of FIG. 8A. Referring also to FIG. 8C, there is shown an isometric section representation of a rotor portion 320 of the motor assembly of FIG. 8A. FIGS. 8A-8C show a rotor stator set with a non-cylindrical air gap 322, for example, to increase overall flux flow through the coils 324. Here, the stator 312 has convex stator teeth 326 and the rotor 314 has concave rotor magnets 330 and yoke 332. Further, the rotor may be made of two halves 318, 320 to facilitate assembly. The disclosed may further be applied to the figures above alternately. Here, a gap 322 may be provided between the stator 312 and the rotor 314 at the rotor receiving area, where the gap 322 has a shape which is not uniformly cylindrical. Here, the rotor 314 may comprise a first top side member 320 and a second bottom side member 318 which have substantial cone shapes orientated in opposite directions. In alternate aspects, other shapes may be used.

Figure 9A:
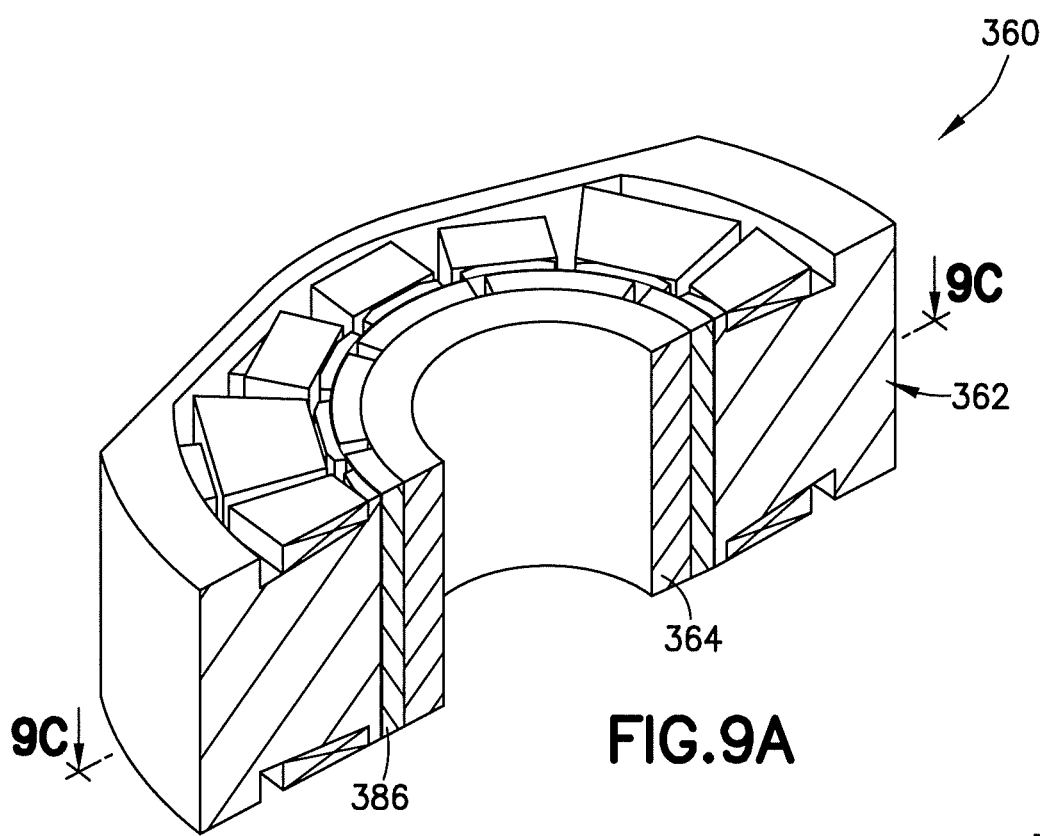
FIG. 9A is an isometric section representation of one exemplary embodiment of a motor assembly.
Figure 9B:
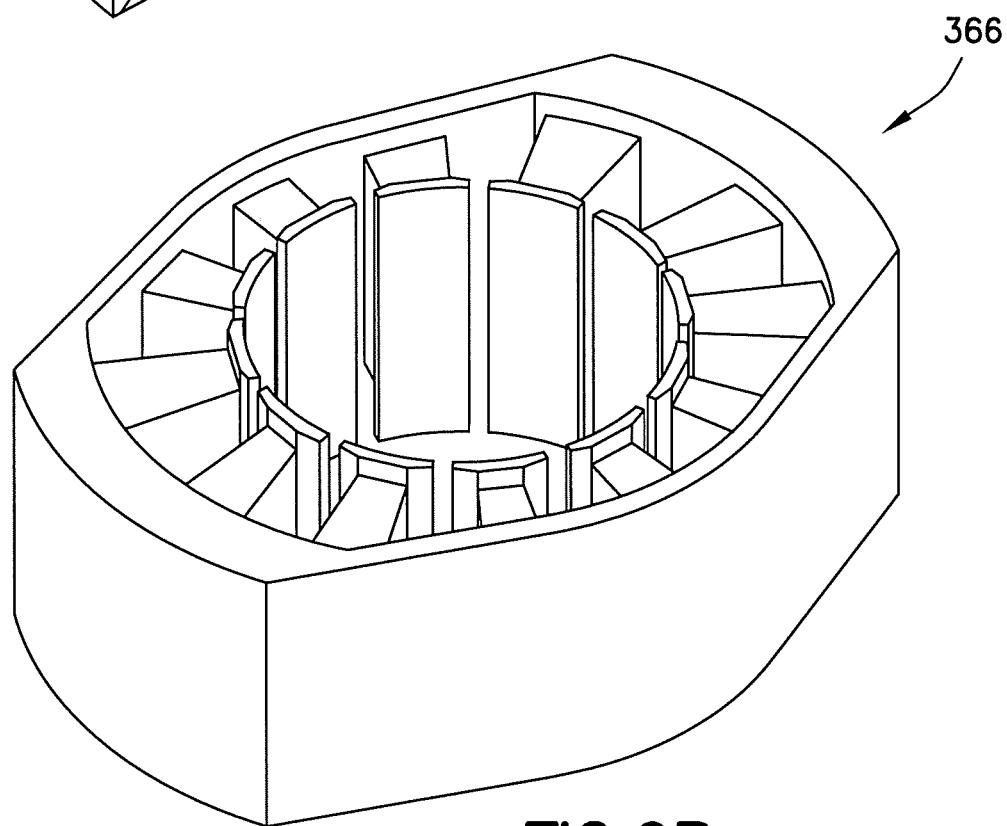
FIG. 9B is an isometric representation of a stator core of the motor assembly of FIG. 9A.
Figure 9C:
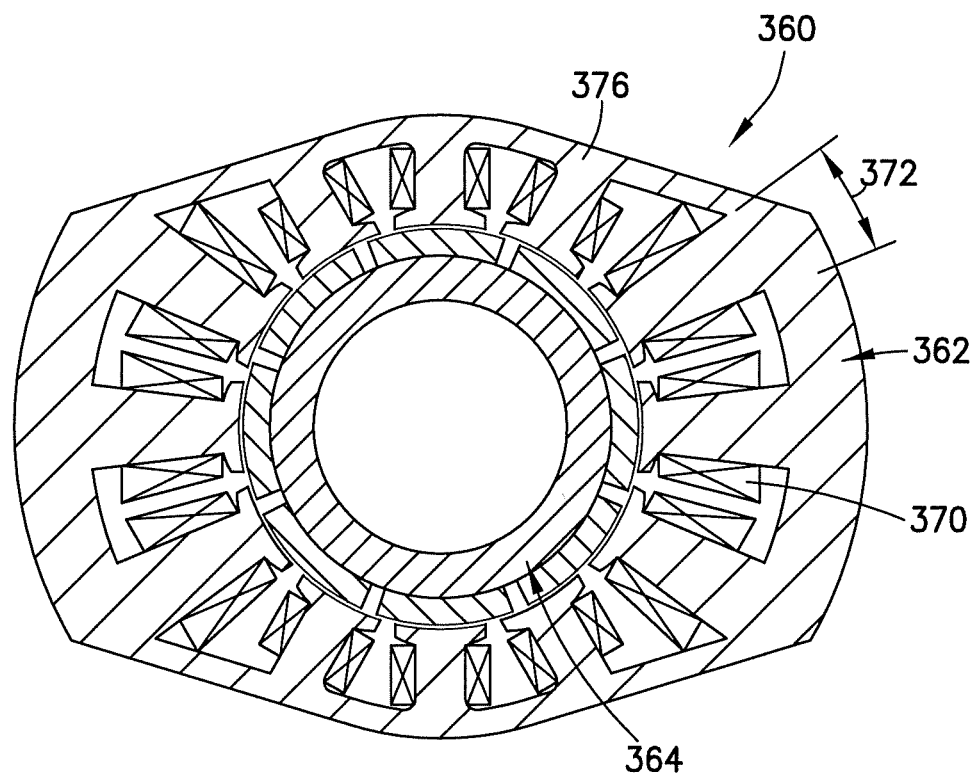
FIG. 9C is a section representation of the motor assembly of FIG. 9A.
Figure 9D:
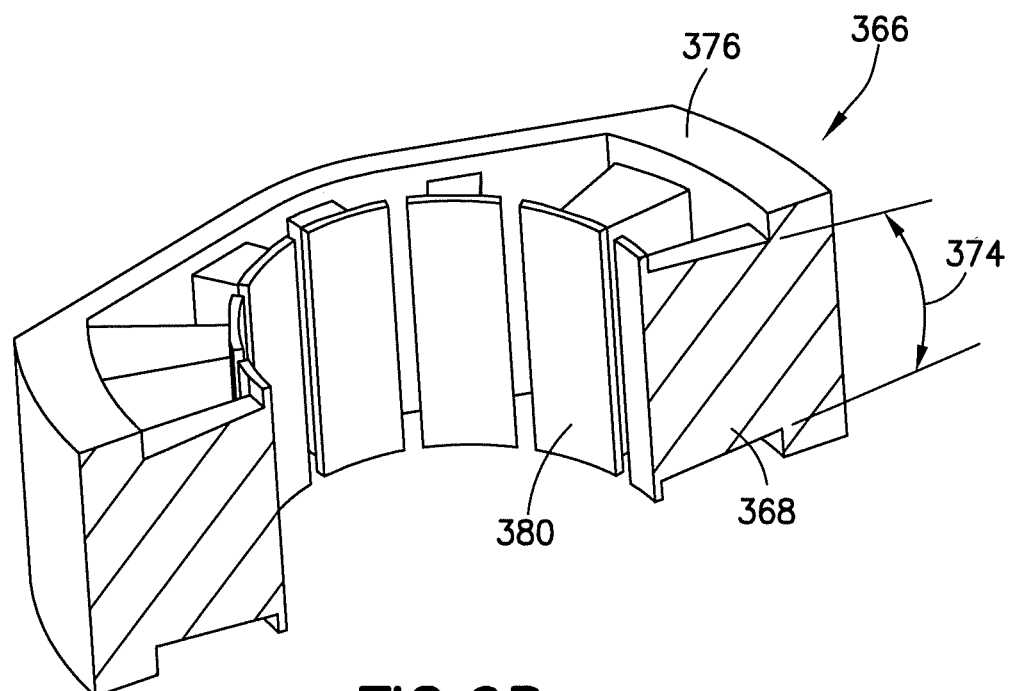
FIG. 9D is an isometric section representation of a stator core of the motor assembly of FIG. 9A.
Figure 9E:
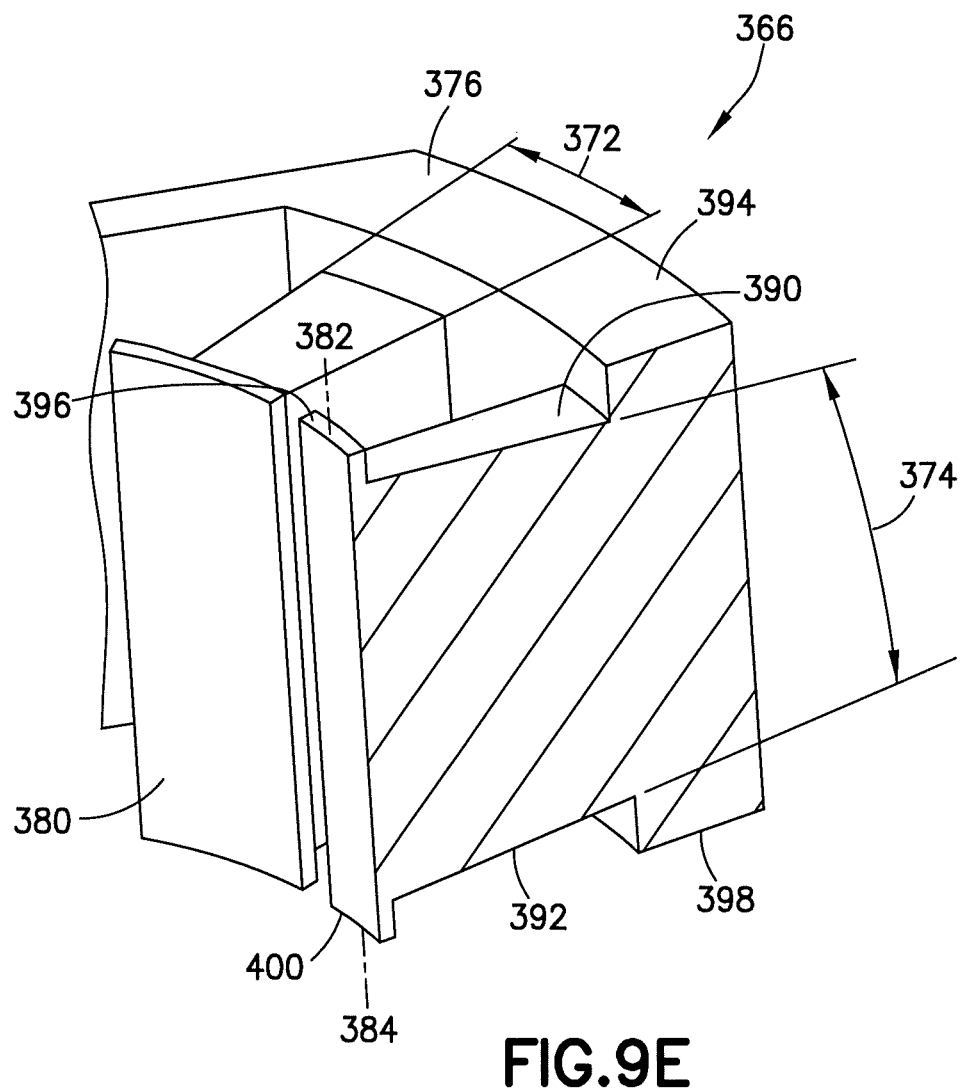
FIG. 9E is a partial isometric section representation of a stator core of the motor assembly of FIG. 9A.

Referring now to FIGS. 9A-9E, there is shown an exemplary non-circular stator with features to facilitate 3-dimensional flux flow. Referring now to FIG. 9A, there is shown an isometric section representation of one exemplary embodiment of motor assembly 360 having stator 362 and rotor 364. Referring also to FIG. 9B, there is shown an isometric representation of stator core 366 of the motor assembly 360 of FIG. 9A. Referring also to FIG. 9C, there is shown a section representation of the motor assembly 360 of FIG. 9A. Referring also to FIG. 9D, there is shown an isometric section representation of stator core 366 of the motor assembly of FIG. 9A. Referring also to FIG. 9E, there is shown a partial isometric section representation of stator core 366 of the motor assembly of FIG. 9A. In FIGS. 9A-9E, there are shown stator teeth 368 and coils 370 tapered in two dimensions 372, 374. This provides space for more winding turns. Here, the stator outer wall 376 may be selectively extended in the axial direction to provide more area for flux to flow through. Further, the stator shoe 380, at the inner diameter, may also be extended axially 382, 384 to allow for more area for flux to flow through. Here, the geometry allows the use of longer magnets 386 to increase flux flow. The features may be used together or in any combination. The disclosed may further be applied to the figures above alternately. For example, in the apparatus, at least some of the teeth may taper in two orthogonal directions as shown or otherwise. Here, The stator may comprise a stator member 366 forming the teeth 368, an outer perimeter wall 376 at outer ends of the teeth and respective shoes 380 at inner ends of the teeth. Top 390 and bottom 392 sides of the teeth may be recessed relative to top 394, 396 and bottom 398, 400 sides of the outer perimeter and the shoes respectively. In the apparatus, the stator member may be a one-piece member or alternately, multi piece members.

In alternate aspects, the non-circular stator may be used for slot-less motors as well. For example, this could be in the form of variable number of winding turns along the stator circumference and varying wall thickness. For the disclosed, the stator material may be anisotropic, such as laminated steel or isotropic such as soft magnetic composites. Further, the stator may double up as the motor housing. For example, the stator may have mounting features machined on it and can mount directly to the machinery or driven components. In alternate aspects, any suitable shape, triangular, oval, square or otherwise may be provided with any suitable tooth/magnet combination, for example, 6-tooth configuration, 12-tooth configuration, 24-tooth configuration or otherwise. Similarly, any suitable noncircular stator (any of the above or any suitable cross-sections) with depopulated coils may be provided. Similarly, any suitable noncircular stator with concave shape, e.g., to fit ball-screw or noncircular stator with a through-hole, e.g., to fit ball-screw may be provided. Similarly, any suitable noncircular motor with laminated stator or noncircular motor with composite stator may be provided. Similarly, any suitable noncircular motor with 3D flux features, e.g., recessed coils, or noncircular motor with hybrid-field features, for example, conical topology or slot-less noncircular motor may be provided. Similarly any suitable noncircular stator integrated with motor housing may be provided. As shown below, the use of an oval or noncircular motor in a robot may be provided, for example, in a Z-axis embodiment, theta-axis embodiment or otherwise.

Figure 11:
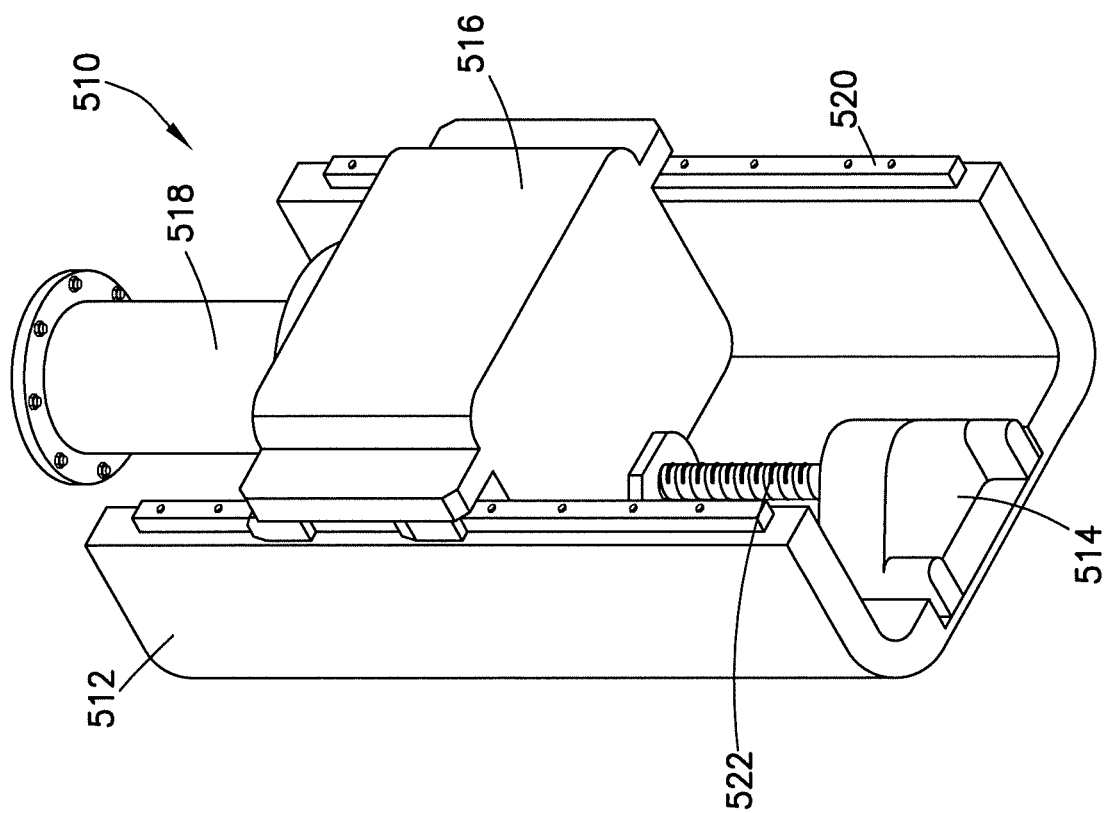
FIG. 11 is an isometric representation of a robot drive.
Figure 10:
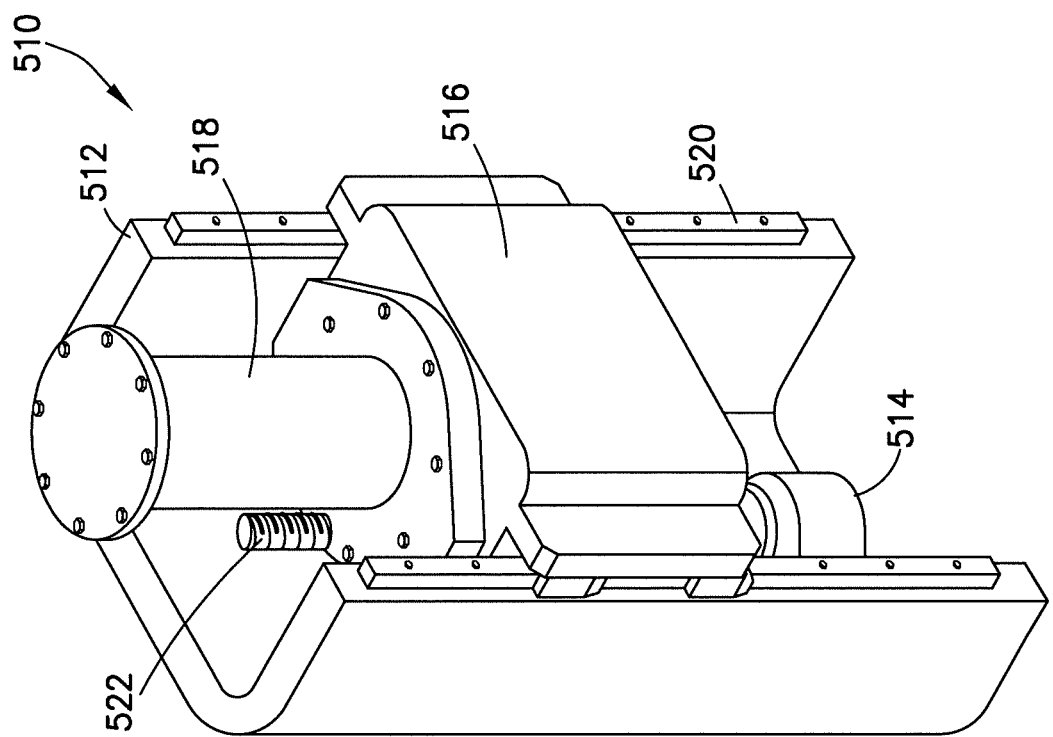
FIG. 10 is an isometric representation of a robot drive.
Figure 13:
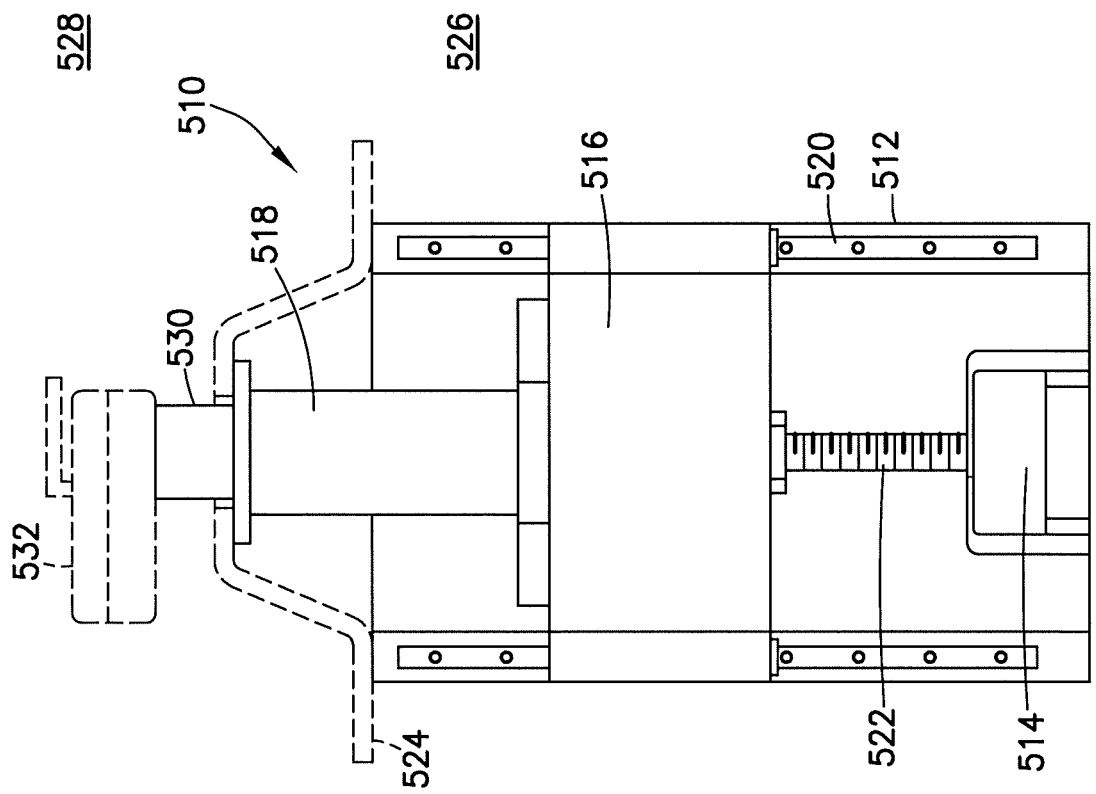
FIG. 13 is a side representation of a robot drive.
Figure 12:
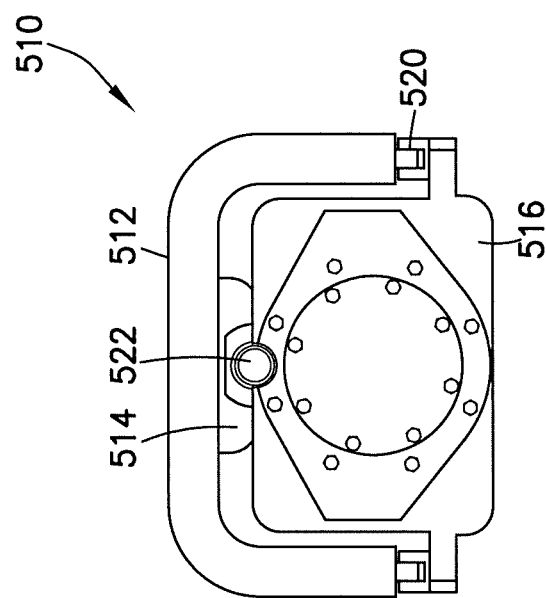
FIG. 12 is a bottom representation of a robot drive.
Figure 15:
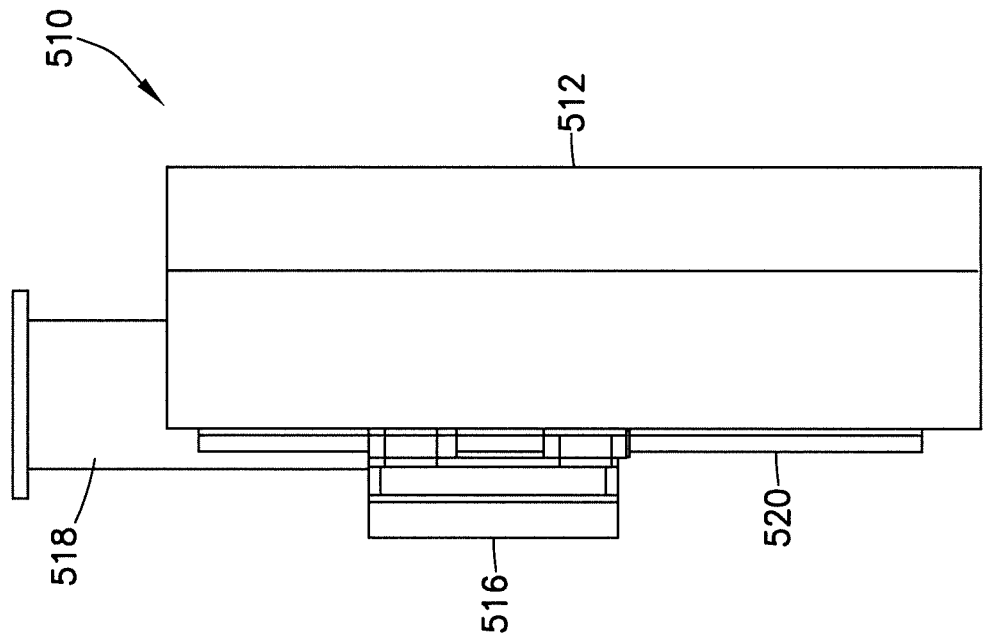
FIG. 15 is a side representation of a robot drive.
Figure 14:
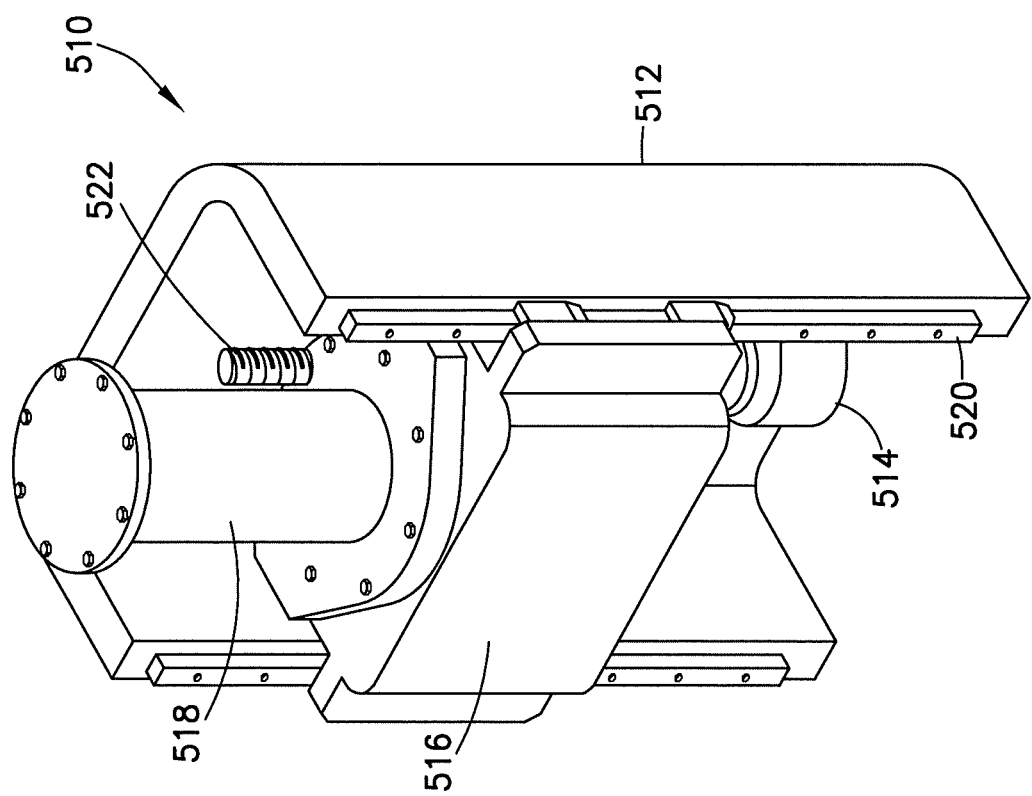
FIG. 14 is an isometric representation of a robot drive.
Figure 17:
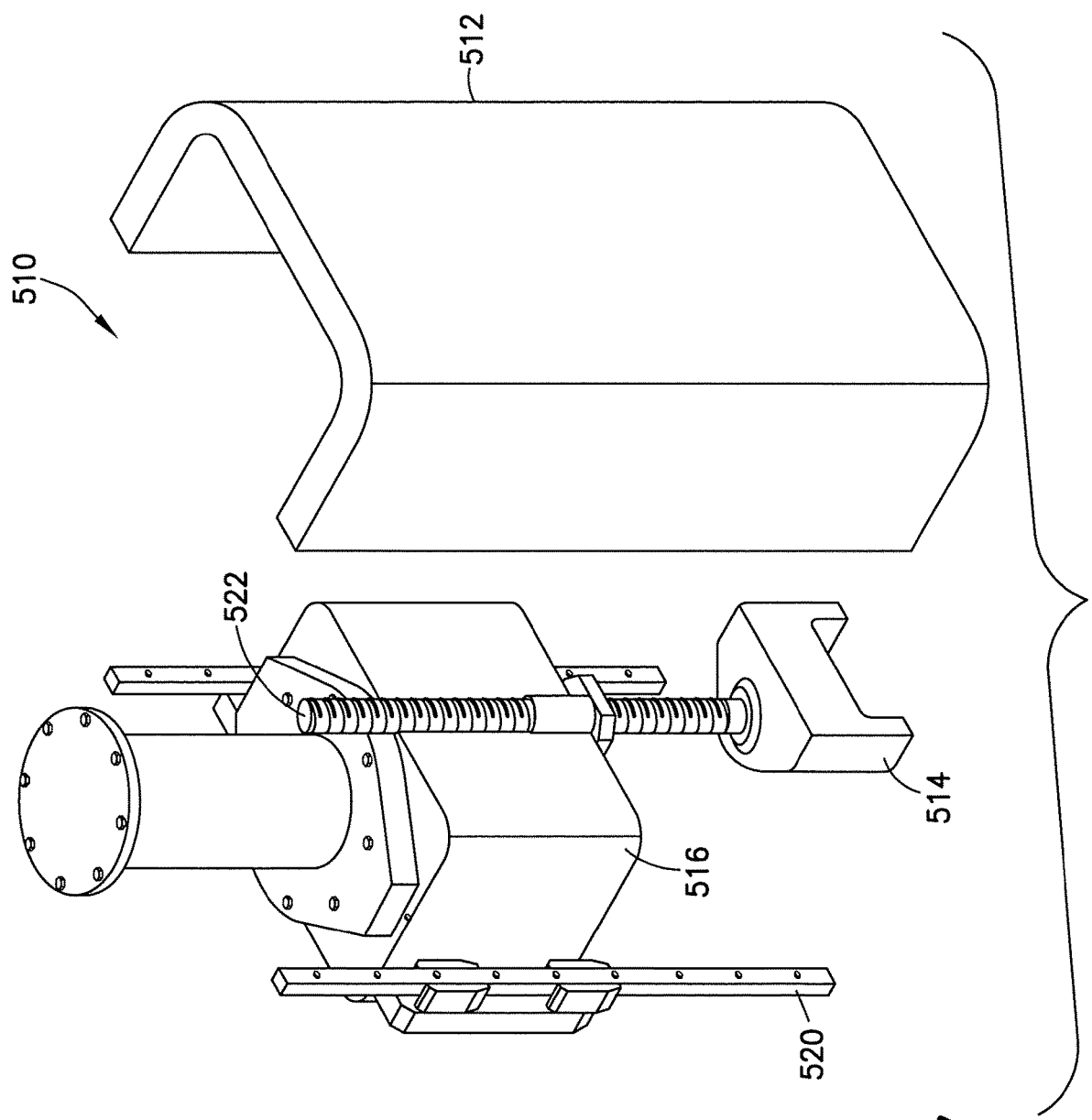
FIG. 17 is an exploded isometric representation of a robot drive.
Figure 18:
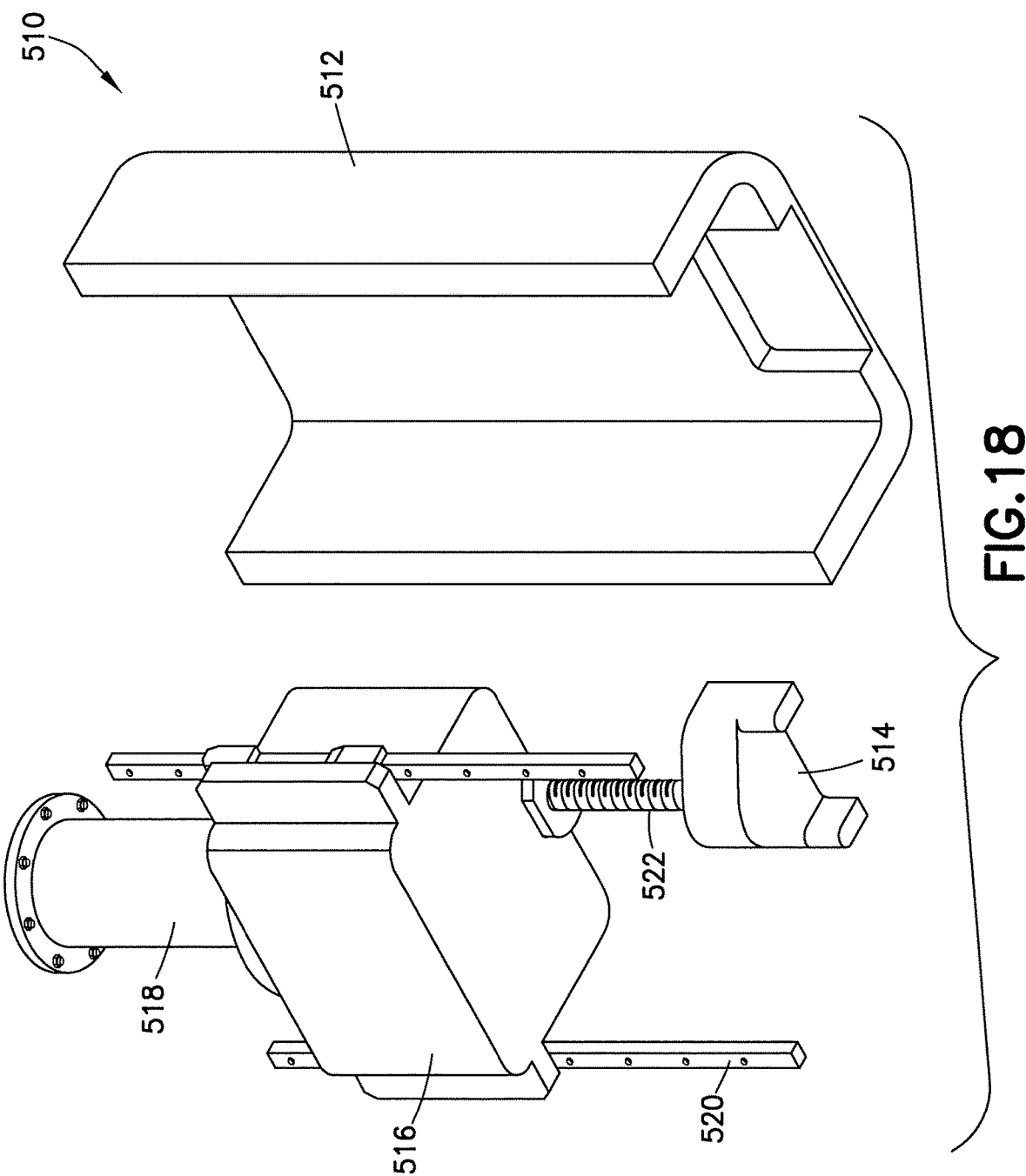
FIG. 18 is an exploded isometric representation of a robot drive.

Referring now to FIGS. 10-11, there are shown isometric representations of robot drive 510. Referring also to FIG. 12, there is shown a bottom representation of robot drive 510. Referring also to FIG. 13, there is shown a side representation of robot drive 510. Referring also to FIG. 14, there is shown an isometric representation of robot drive 510. Referring also to FIG. 15, there is shown a side representation of robot drive 510. Referring also to FIGS. 16-18, there are shown exploded isometric representations of robot drive 510. Robot 510 may have features as disclosed in U.S. Pat. No. 8,716,909 having an issue date of May 6, 2015 and entitled "Robot with Heat Dissipating Stator" which is incorporated by reference here in in its entirety. Robot 510 has housing 512 with a Z motor assembly and housing 514 coupled at a lower portion of housing 512. Z motor assembly and housing 514 may incorporate features of the non-circular stator and motor assemblies disclosed here in. T motor assembly and housing 516 is vertically moveable within housing 512 and may be coupled to bellows 518 and further coupled to housing 512 via slides 520 which constrain T motor assembly and housing 516 to move in a vertical direction. Screw 522 is coupled to and rotated by Z motor assembly and housing 514 and has a nut coupled to T motor assembly and housing 516 which is driven and vertically moveable within housing 512 by virtue of rotation of screw 522 rotated by a rotor of Z motor assembly and housing 514. T motor assembly and housing 516 may incorporate rotor and stator sets as any of the disclosed embodiment, for example, T motor assembly and housing 516 may incorporate one or more stacked rotor and stator sets as shown in FIGS. 6, 7 or otherwise where leadscrew 522 may be packaged closer to the center of rotation of T motor assembly and housing 516 as compared to an arrangement with a circular stator. Referring to FIG. 13, the apparatus may further comprise one or more drive shaft(s) 530 extending from one or more rotor(s) of T motor assembly and housing 516 and a robot arm 532 connected to the drive shaft. Here, mounting flange 524 may be coupled to housing 512 and bellows 518 separating atmosphere 526 from vacuum 528 where output shaft(s) 530 and arm 532 are in the vacuum environment. Here, FIGS. 10-18 show a robot drive 510 to illustrate the embodiment of the non-circular motors. Here, non-circular motors may be used in any suitable axis to allow for the efficient packaging of additional or complimentary components. For example, the robot may use the non-circular or "football" shaped Z-axis motor and a round or rectangular T-axis motor with a hole though it or a semi-circular cut through it to create a smaller distance from the center of the T-axis motor to the ball-screw. Here, one or more non-circular motors may be provided in a robot to optimize packaging such that the motors can be packaged to utilize space efficiently, for example, ball screw going through the T-motor, reduced distance of the ball-screw axis to the frame due to the shape of the Z-motor or otherwise.

In accordance with one exemplary an aspect, apparatus comprises a motor comprising a rotor and a stator. The rotor is located at least partially in a rotor receiving area of the stator. The stator comprises at least one coil winding and teeth. The at least one coil winding is located on at least some of the teeth, where the teeth comprise a first set of the teeth and a second set of the teeth. The teeth of the first set of teeth are longer in a radial direction from the rotor receiving area than the teeth of the second set of teeth.

In the apparatus, the stator may comprise a stator member forming the teeth. A base of each of the teeth may be located at a portion of the stator member which forms an outer perimeter wall of the stator member. The outer perimeter wall has a shape as one of a substantial oval shape, a substantial triangle shape, a substantial square shape, a substantial rectangle shape or a substantial polygon shape.

In the apparatus, the stator may comprise a stator member forming the teeth, where the stator member may comprise at least one component receiving area spaced from the rotor receiving area. The at least one component receiving area may be sized and shaped to have a component movably located therein.

In the apparatus, the at least one component receiving area may have a center axis which is parallel to a center axis of the rotor receiving area.

In the apparatus, the at least one component receiving area may have an open side at a lateral side perimeter wall of the stator member.

In the apparatus, the at least one component receiving area may be substantially closed except at top and bottom sides of the stator member.

In the apparatus, the teeth may extend radially inward towards the rotor receiving area. The teeth may not be located on two opposite sides of the rotor receiving area along arcs of about 40-100 degrees.

In the apparatus, at least one coil winding may be located on the first set of teeth and not located on the second set of teeth.

In the apparatus, the at least one coil winding may be located on the first and second sets of teeth. The at least one coil winding may comprise more winding turns on the first set of teeth than the second set of teeth and/or where the at least one coil winding may comprise thicker wire on the first set of teeth than the second set of teeth.

In the apparatus, a gap may be provided between the stator and the rotor at the rotor receiving area, where the gap has a shape which is not uniformly cylindrical.

In the apparatus, the rotor may comprise a first top side member and a second bottom side member which have substantial cone shapes orientated in opposite directions.

In the apparatus, at least some of the teeth may taper in two orthogonal directions.

In the apparatus, the stator may comprise a stator member forming the teeth, an outer perimeter wall at outer ends of the teeth and respective shoes at inner ends of the teeth. Top and bottom sides of the teeth may be recessed relative to top and bottom sides of the outer perimeter and the shoes.

In the apparatus, the stator member may be a one-piece member.

The apparatus may further comprise a drive shaft extending from the rotor and a robot arm connected to the drive shaft.

In accordance with another exemplary aspect, a method may comprise forming a stator member having teeth. The stator may comprise a rotor receiving area, where the teeth may comprise a first set of the teeth and a second set of the teeth. The teeth of the first set of teeth may be longer in a radial direction from the rotor receiving area than the teeth of the second set of teeth. The method may further comprise locating at least one coil winding on at least some of the teeth.

In accordance with another exemplary aspect, an apparatus may comprise a motor comprising a rotor and a stator. The rotor may be located at least partially in a rotor receiving area of the stator. The stator may comprise a stator member having teeth and at least one component receiving area spaced from the rotor receiving area. The teeth may comprise a first set of the teeth and a second set of the teeth, where the teeth of the first set of teeth may be longer in a radial direction from the rotor receiving area than the teeth of the second set of teeth, and where the second set of teeth are located closer to the least one component receiving area than the first set of teeth. At least one coil winding may be on the stator member. At least one component may be movably located in the at least one component receiving area.

The apparatus may further comprise where the at least one component comprises a rod having a screw thread located in the at least one component receiving area. The rod may be configured to rotate in the at least one component receiving area. The at least one component receiving area may be configured for the stator to longitudinally move up and down along the rod.

The apparatus may further comprise a motor housing having the stator therein. The stator housing may be connected to the screw thread of the rod such that rotation of the rod causes the motor housing to longitudinally move along the rod.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A motor comprising:
   a rotor; and
   a stator, where the rotor is located at least partially in a rotor receiving area of the stator, where the stator comprises at least one coil winding and a stator member forming teeth, where the at least one coil winding is located on at least some of the teeth, where the teeth comprise a first set of the teeth and a second set of the teeth, where the teeth of the first set of teeth are longer in a radial direction from the rotor receiving area than the teeth of the second set of teeth, where at least some of the teeth taper in two orthogonal directions,
   where the stator member forms an outer perimeter wall at outer ends of the teeth and shoes at inner ends of the teeth, where top and bottom sides of the teeth are recessed relative to top and bottom sides of the outer perimeter wall and the shoes, where the top and bottom sides of the outer perimeter wall and the shoes have a substantially same height,
   where a top step is provided from respective top sides of the shoes down to the respective top sides of the teeth such that a top recess is provided on the teeth between an outward facing surface of a top wall of each shoe and an inward facing surface of a top portion of the outer perimeter wall, and
   where a bottom step is provided from the respective bottom sides of the teeth down to respective bottom sides of the shoes such that a bottom recess is provided on the teeth between an outward facing surface of a bottom wall of each shoe and an inward facing surface of a bottom portion of the outer perimeter wall.

2. The motor as claimed in claim 1 where the outer perimeter wall has a shape as one of a substantial oval shape, a substantial triangle shape, a substantial square shape, a substantial rectangle shape or a substantial polygon shape.

3. The motor as in claim 1 where the stator member comprises at least one component receiving area spaced from the rotor receiving area, where the at least one component receiving area is sized and shaped to have a component movably located therein.

4. The motor as in claim 3 where the at least one component receiving area has a center axis which is parallel to a center axis of the rotor receiving area.

5. The motor as in claim 4 where the at least one component receiving area has an open side at a lateral side of the perimeter wall of the stator member.

6. The motor as in claim 4 where the at least one component receiving area is substantially closed except at top and bottom sides of the stator member.

7. The motor as in claim 1 where the teeth extend radially inward towards the rotor receiving area, and where the teeth are not located on two opposite sides of the rotor receiving area along arcs of about 40-100 degrees.

8. The motor as in claim 1 where the at least one coil winding is located on the first set of teeth and not located on the second set of teeth.

9. The motor as in claim 1 where the at least one coil winding is located on the first and second sets of teeth, and where the at least one coil winding comprises more winding turns on the first set of teeth than the second set of teeth and/or where the at least one coil winding comprises thicker wire on the first set of teeth than the second set of teeth.

10. The motor as in claim 1 where a gap is provided between the stator and the rotor at the rotor receiving area, where the gap has a shape which is not uniformly cylindrical.

11. The motor as in claim 10 where the rotor comprises a first top side member and a second bottom side member, where the first top side member and the second bottom side member are separate members which have substantial cone shapes orientated in opposite directions.

12. An apparatus comprising:
    the motor as claimed in claim 1;
    a drive shaft extending from the rotor; and
    a robot arm connected to the drive shaft.

13. A method comprising:
    providing a rotor; and
    providing a stator, where the stator comprises at least one coil winding and a stator member forming teeth, where the at least one coil winding is located on at least some of the teeth, where the teeth comprise a first set of the teeth and a second set of the teeth, where the teeth of the first set of teeth are longer in a radial direction from a rotor receiving area of the stator than the teeth of the second set of teeth, where at least some of the teeth taper in two orthogonal directions, where the stator member forms an outer perimeter wall at outer ends of the teeth and shoes at inner ends of the teeth, where top and bottom sides of the teeth are recessed relative to top and bottom sides of the outer perimeter wall and the shoes, where the top and bottom sides of the outer perimeter wall and the shoes have a substantially same height, where a top step is provided from respective top sides of the shoes down to the respective top sides of the teeth such that a top recess is provided on the teeth between an outward facing surface of a top wall of each shoe and an inward facing surface of a top portion of the outer perimeter wall, and where a bottom step is provided from the respective bottom sides of the teeth down to respective bottom sides of the shoes such that a bottom recess is provided on the teeth between an outward facing surface of a bottom wall of each shoe and an inward facing surface of a bottom portion of the outer perimeter wall; and positioning the rotor in the stator, where the rotor is located at least partially in the rotor receiving area of the stator.

14. The method as claimed in claim 13 where the providing of the stator comprises the outer perimeter wall of the stator having a shape as one of a substantial oval shape, a substantial triangle shape, a substantial square shape, a substantial rectangle shape or a substantial polygon shape.

15. A motor comprising:

a rotor; and a stator, where the rotor is located at least partially in a rotor receiving area of the stator, where the stator comprises at least one coil winding and a stator member forming teeth, where the at least one coil winding is located on at least some of the teeth, where the teeth comprise a first set of the teeth and a second set of the teeth, where at least some of the teeth taper in two orthogonal directions, where the stator member forms an outer perimeter wall at outer ends of the teeth and shoes at inner ends of the teeth, where top and bottom sides of the teeth are recessed relative to top and bottom sides of the outer perimeter wall and the shoes, where the top and bottom sides of the outer perimeter wall and the shoes have a substantially same height, where a top step is provided from respective top sides of the shoes down to the respective top sides of the teeth such that a top recess is provided on the teeth between an outward facing surface of a top wall of each shoe and an inward facing surface of a top portion of the outer perimeter wall.

16. The motor as claimed in claim 15 where a bottom step is provided from the respective bottom sides of the teeth down to respective bottom sides of the shoes such that a bottom recess is provided on the teeth between an outward facing surface of a bottom wall of each shoe and an inward facing surface of a bottom portion of the outer perimeter wall.

* * * * *